US008015009B2

(12) United States Patent
Harband et al.

(10) Patent No.: US 8,015,009 B2
(45) Date of Patent: Sep. 6, 2011

(54) SPEECH DERIVED FROM TEXT IN COMPUTER PRESENTATION APPLICATIONS

(76) Inventors: Joel Jay Harband, Petach Tikvah (IL); Uziel Yosef Harband, Efrat (IL)

( * ) Notice: Subject to any disclaimer, the term of this patent is extended or adjusted under 35 U.S.C. 154(b) by 1389 days.

(21) Appl. No.: 11/381,525

(22) Filed: May 3, 2006

(65) Prior Publication Data

US 2006/0253280 A1 Nov. 9, 2006

(30) Foreign Application Priority Data

May 4, 2005 (IL) ........................................ 168400

(51) Int. Cl.

| | |
|---|---|
| ***G10L 13/08*** | (2006.01) |
| ***G10L 13/00*** | (2006.01) |
| ***G10L 11/00*** | (2006.01) |
| ***G10L 21/00*** | (2006.01) |
| ***G10L 21/06*** | (2006.01) |
| ***G06F 17/20*** | (2006.01) |
| ***G06F 3/16*** | (2006.01) |

(52) U.S. Cl. ........ 704/260; 704/258; 704/270; 704/275; 704/271; 704/272; 715/256; 715/727; 715/728

(58) Field of Classification Search .................. 704/260, 704/258, 270; 715/256, 727, 728
See application file for complete search history.

(56) References Cited

U.S. PATENT DOCUMENTS

| | | | | |
|---|---|---|---|---|
| 6,161,091 | A * | 12/2000 | Akamine et al. | 704/258 |
| 6,252,588 | B1 * | 6/2001 | Dawson | 715/752 |
| 6,324,511 | B1 * | 11/2001 | Kiraly et al. | 704/260 |
| 6,446,041 | B1 * | 9/2002 | Reynar et al. | 704/260 |
| 6,975,988 | B1 * | 12/2005 | Roth et al. | 704/260 |
| 7,120,583 | B2 * | 10/2006 | Kaneko et al. | 704/260 |
| 7,194,411 | B2 * | 3/2007 | Slotznick et al. | 704/271 |
| 7,412,389 | B2 * | 8/2008 | Yang | 704/260 |
| 2002/0072906 | A1 * | 6/2002 | Koh | 704/260 |
| 2002/0099549 | A1 * | 7/2002 | Nguyen | 704/270 |
| 2003/0011643 | A1 * | 1/2003 | Nishihata | 345/810 |
| 2003/0128817 | A1 * | 7/2003 | Myers et al. | 379/67.1 |
| 2004/0059577 | A1 * | 3/2004 | Pickering | 704/260 |
| 2005/0071165 | A1 * | 3/2005 | Hofstader et al. | 704/270.1 |
| 2006/0100877 | A1 * | 5/2006 | Zhang et al. | 704/260 |
| 2006/0143559 | A1 * | 6/2006 | Spielberg et al. | 715/512 |
| 2009/0073176 | A1 * | 3/2009 | Pirchio | 345/501 |

OTHER PUBLICATIONS

Chong, N. S. T., Tosukhowong, P., and Sakauchi, M. (2002). Whiteboard VCR: a web lecture production tool for combining human narration and text-to-speech synthesis. Educational Technology & Society, 5(4), 88-97.*

Gravel, Ross. Answering Back. Review. Ability Magazine. 2002, p-1-2.*

Bajaj, Geetesh. PowerTalk Review, 2003.*

PowerTalk 1.2.2. Mar. 2005. Fullmeasure. http://fullmeasure.co.uk/powertalk/. pp. 1-6.*

Minhua Eunice Ma. Confucius: An intelligent multimedia storytelling interpretation and presentation system. Technical report, School of Computing and Intelligent Systems, University of Ulster, Magee, Sep. 2002.*

* cited by examiner

*Primary Examiner* — James S. Wozniak
*Assistant Examiner* — Paras Shah

(57) ABSTRACT

A computer system comprising hardware and software elements; the hardware elements including a processor, a display means and a speaker, the software elements comprising a speech synthesizer, a database platform and a software application comprising a methodology of inputting and tabulating visual elements and verbal elements into the database, links for linking the visual elements and verbal elements; operations for manipulating the database and for enunciating the verbal elements as the corresponding visual elements are displayed on the display means.

17 Claims, 23 Drawing Sheets

Overall Diagram of Dataset Data Tables

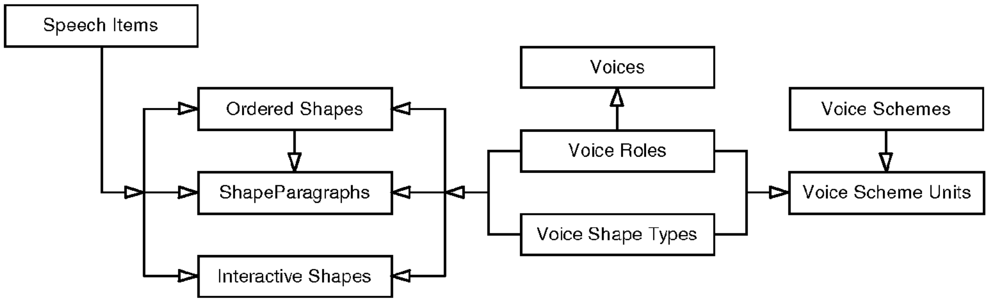
Figure 1 Overall Diagram of Dataset Data Tables
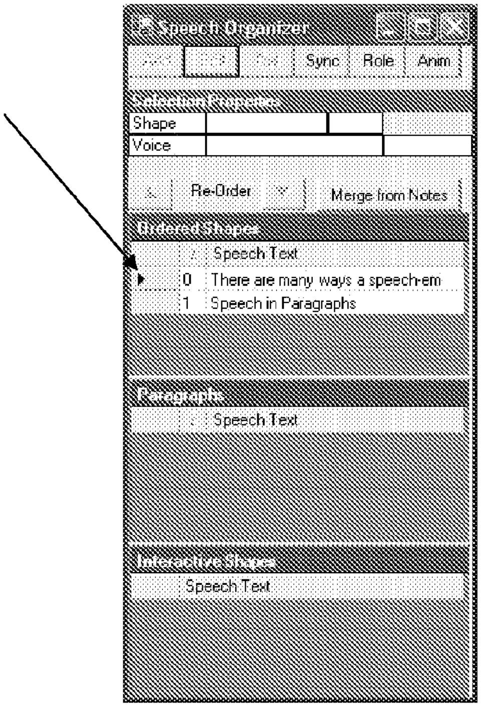
Figure 2 Speech Organizer Form – Ordered Shapes Display

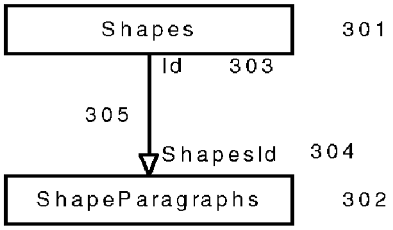
Figure 3 Relation between Shapes and ShapeParagraphs Tables
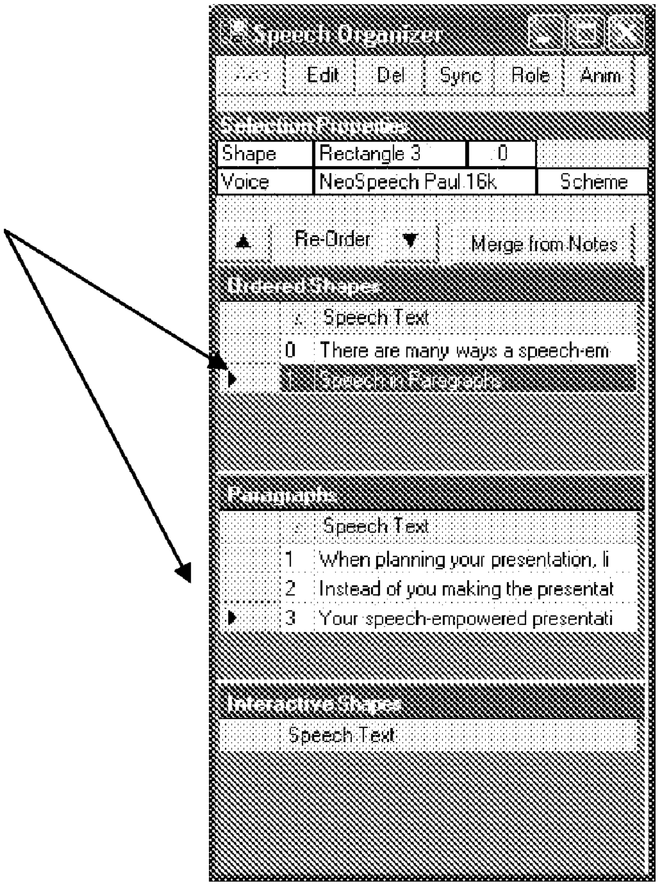
Figure 4 Speech Organizer Form - Paragraphs Display

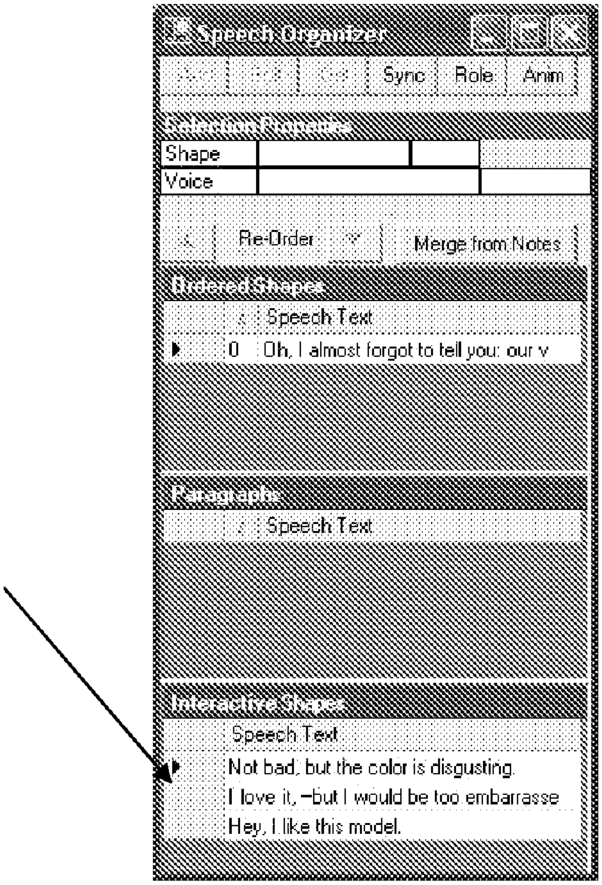
Figure 5 Speech Organizer Form – Interactive Shapes Display
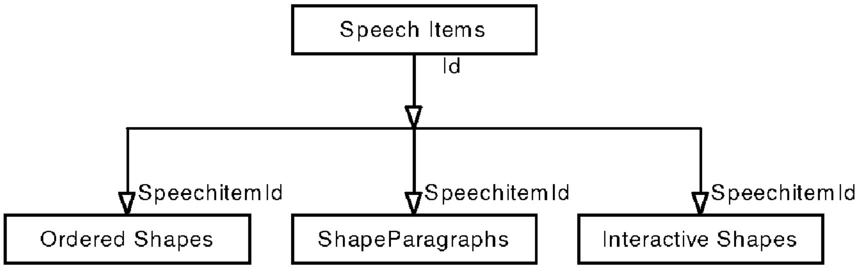
Figure 6 Relation between SpeechItems and Shapes

| | Voice Scheme | | |
|---|---|---|---|
| **Voice** | **VoiceRole** | **VoiceShapeType** | **Shape** |
| Microsoft Mike → | MaleAdult → | Title → | Text frame Title |
| Microsoft Mary ← | FemaleAdult ← | Subtitle ← | Text frame subtitle |
| Microsoft Mike | MaleAdult | Odd Paragraph | Text frame odd paragraph |
| Microsoft Mary | FemaleAdult | Even Paragraph | Text frame even paragraph |
| Microsoft Mary | FemaleAdult | Other | AutoShape |

Figure 7 Assigning Voices to Shapes by a Voice Scheme

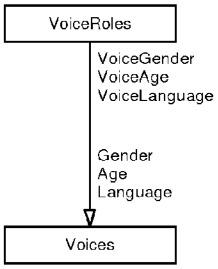

Figure 8 Relation between Voice Roles and Voices

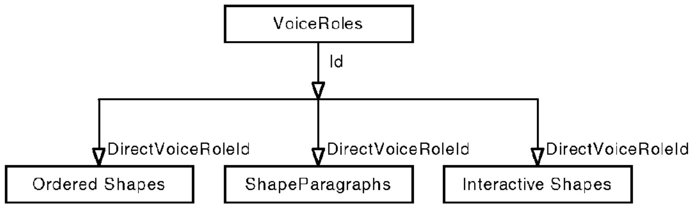
Figure 9 Relation between VoiceRoles and Shapes
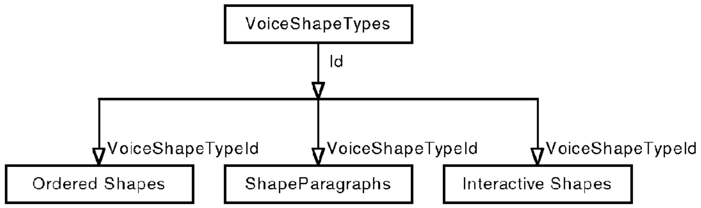
Figure 10 Relation between VoiceShapeTypes and Shapes
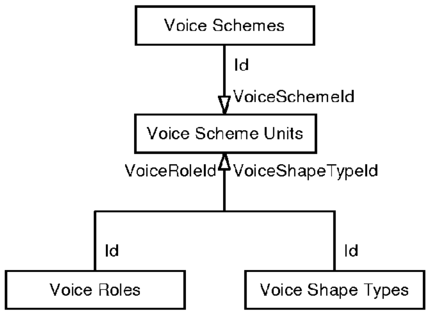
Figure 11 Relation between VoiceSchemes, VoiceScheme Units Voice Roles and VoiceShapeTypes

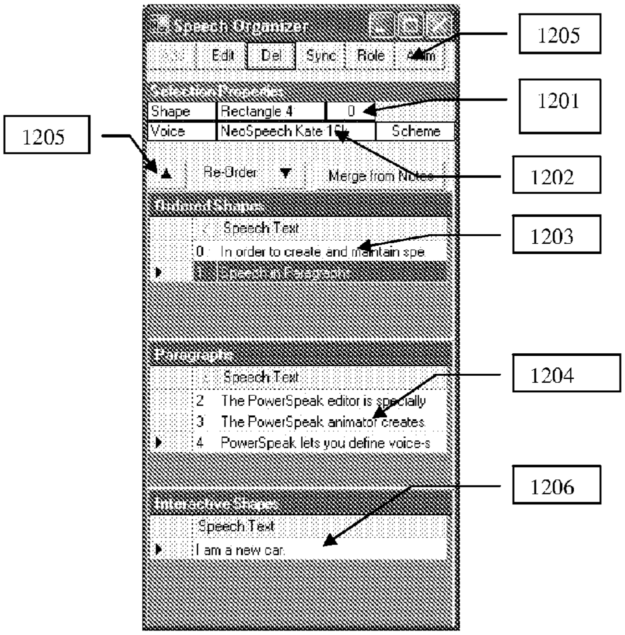
Figure 12 Speech Organizer Form
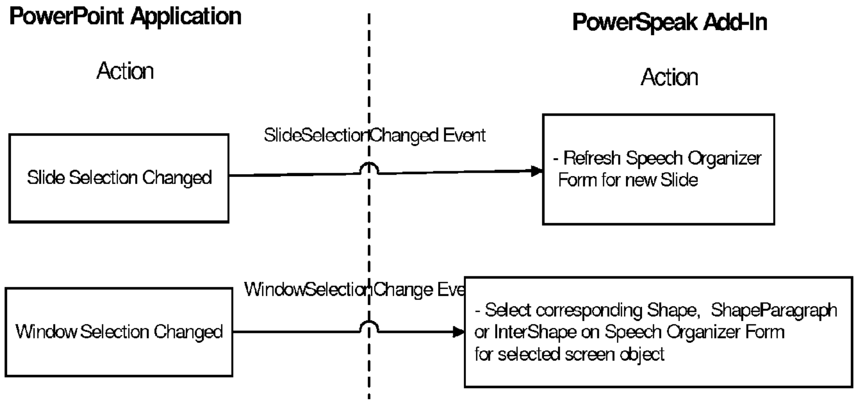
Figure 13 Speech Organizer Events

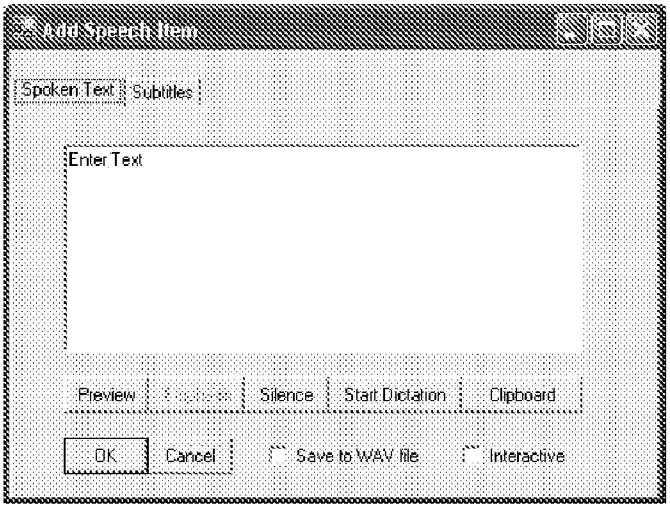
Figure 14 Add Speech Item Dialog

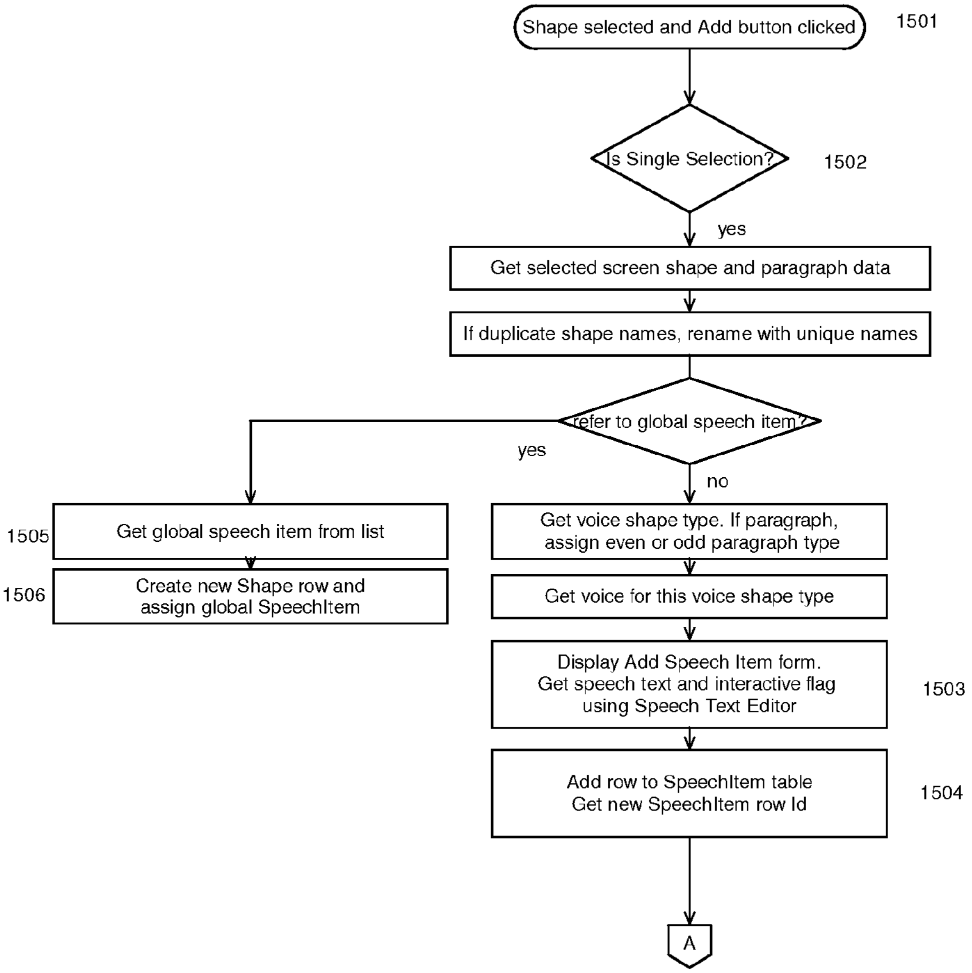
Figure 15 Add SpeechItem Flow 1

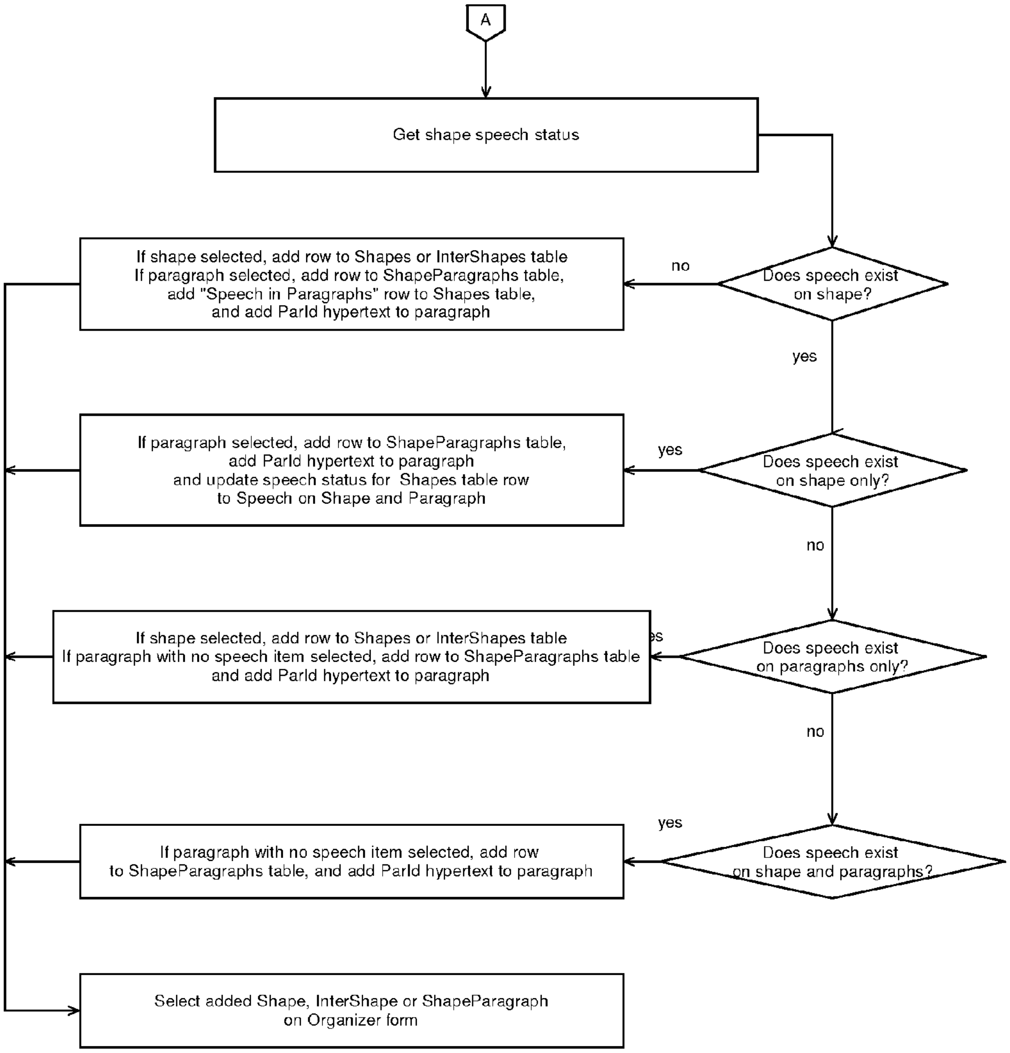
Figure 16 Add SpeechItem Flow 2

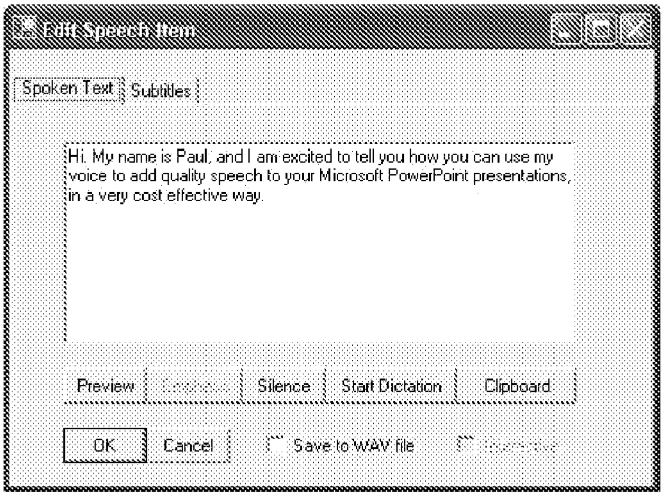
Figure 17 Edit Speech Item Dialog
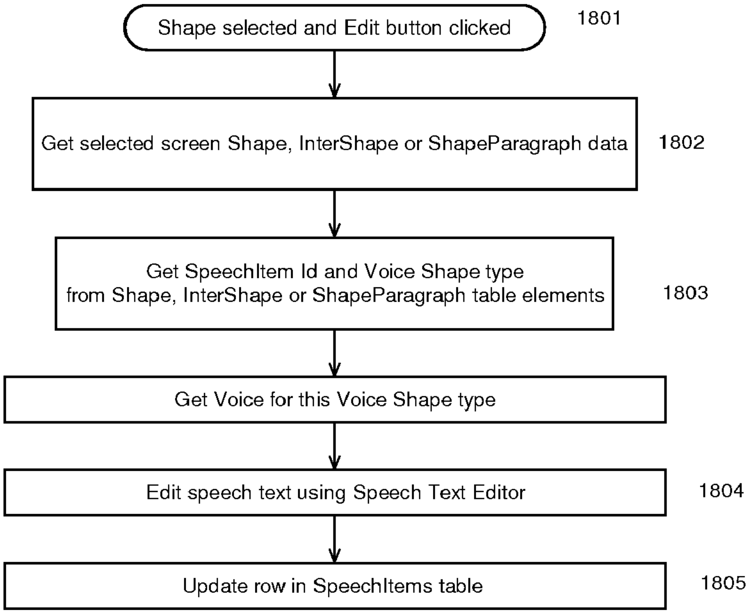
Figure 18 Edit Speech Item Flow

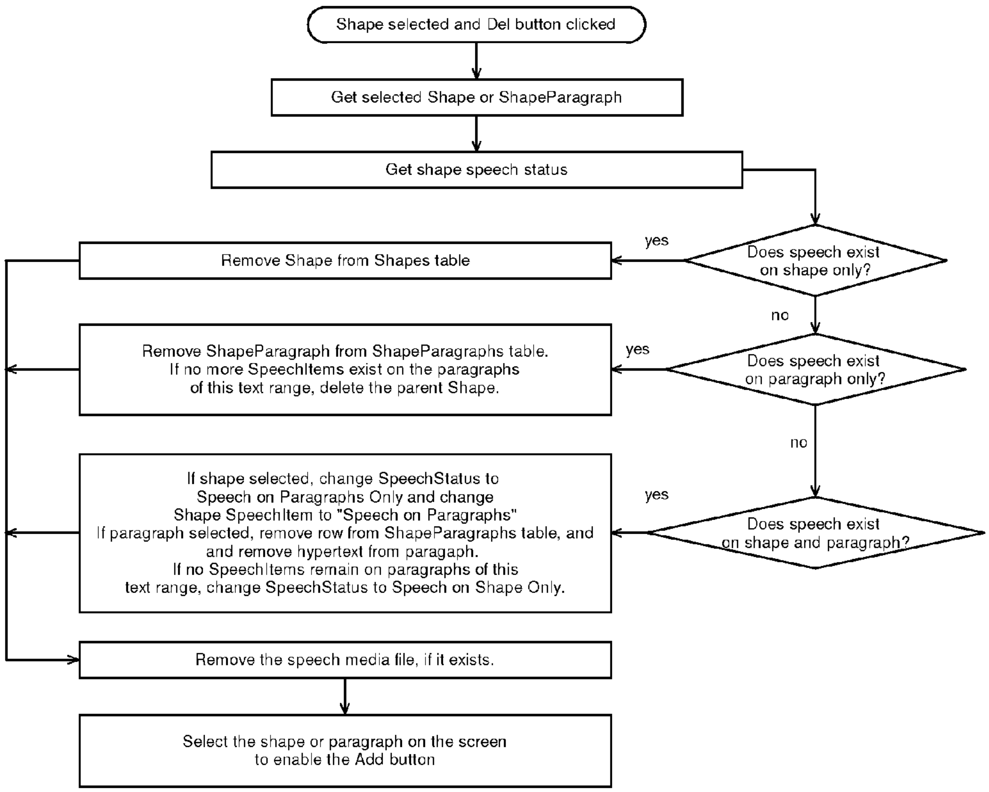
Figure 19 Delete SpeechItem Flow

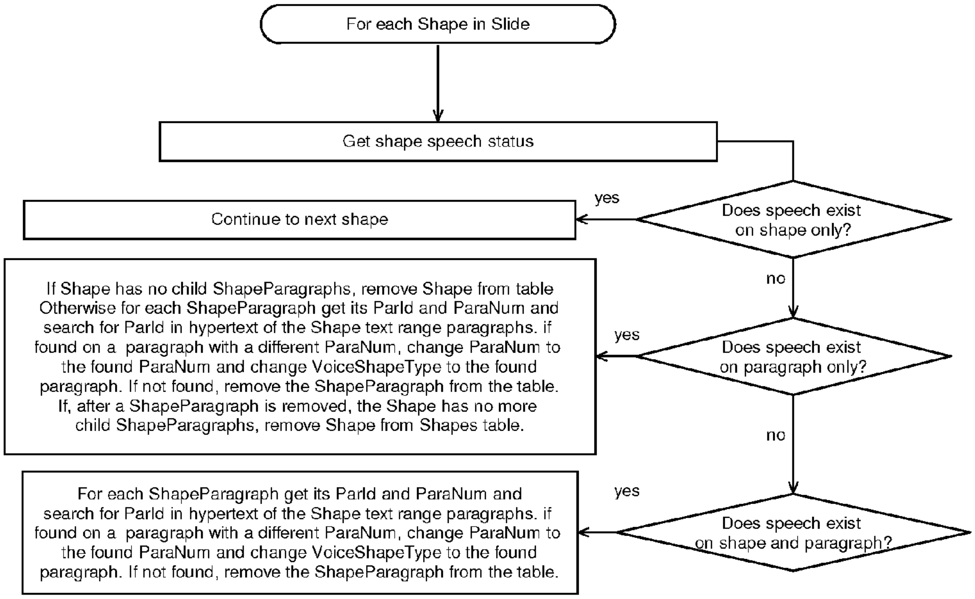
Figure 20 Sync Paragraphs Function Flow
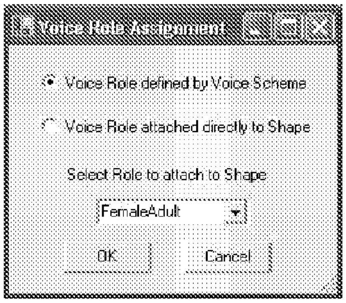
Figure 21 Voice Role Assignment Dialog

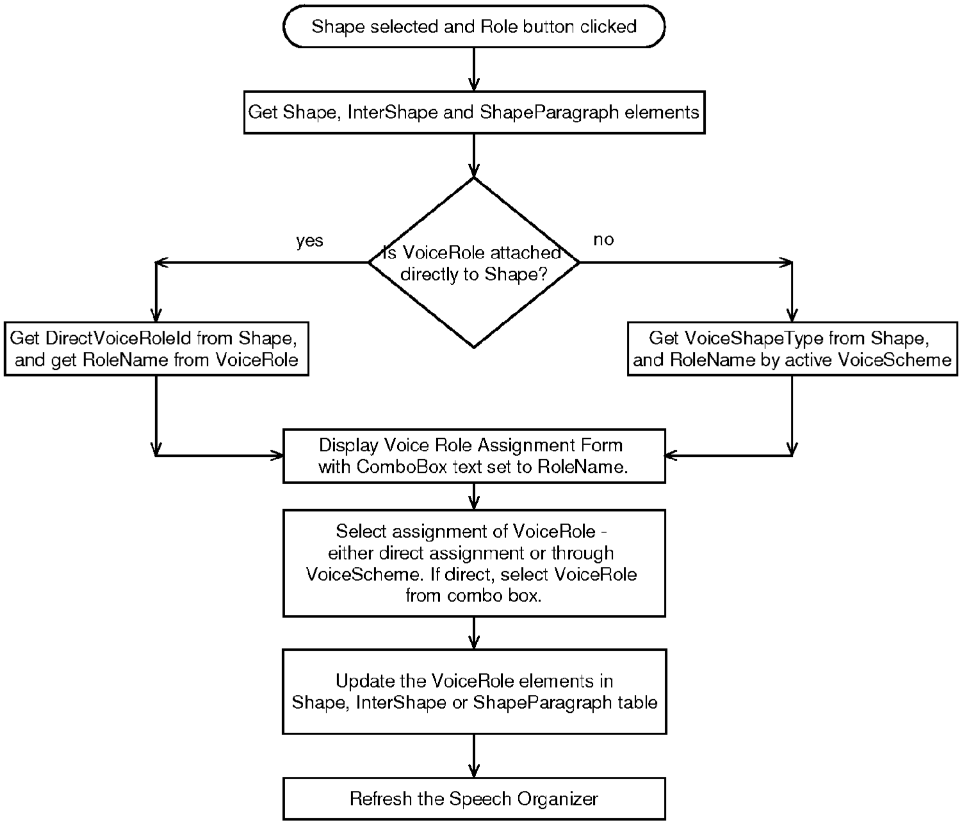
Figure 22 Role Function Flow

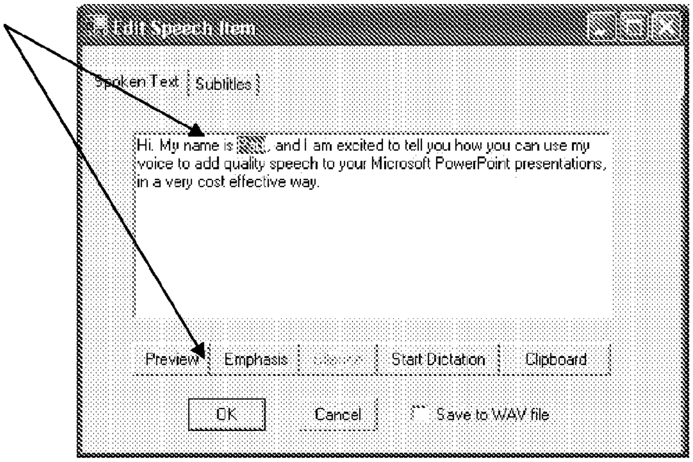
Figure 23 Edit Speech - Emphasis Button Enabled for Selected Regular Text
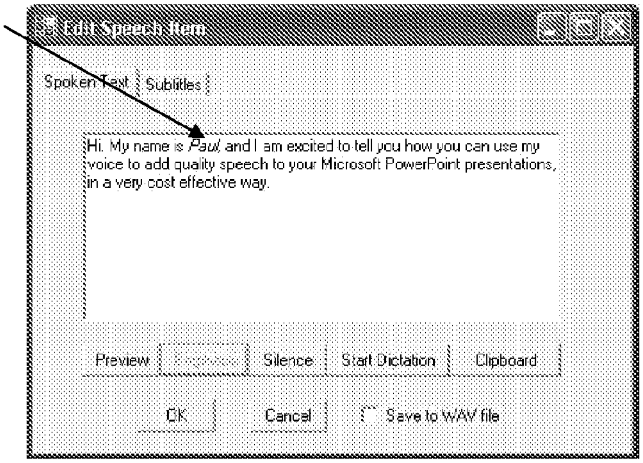
Figure 24 Edit Speech - Emphasized Text in Italics

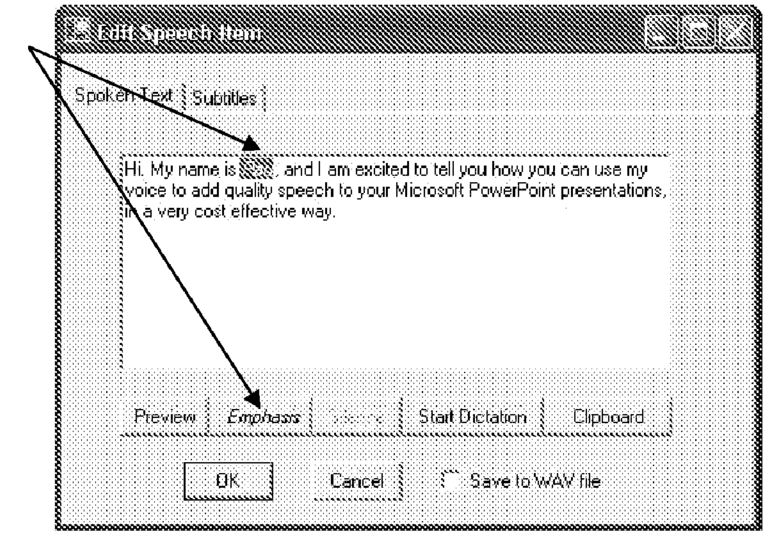
Figure 25 Edit Speech - Emphasis Button Enabled for Italicized Text
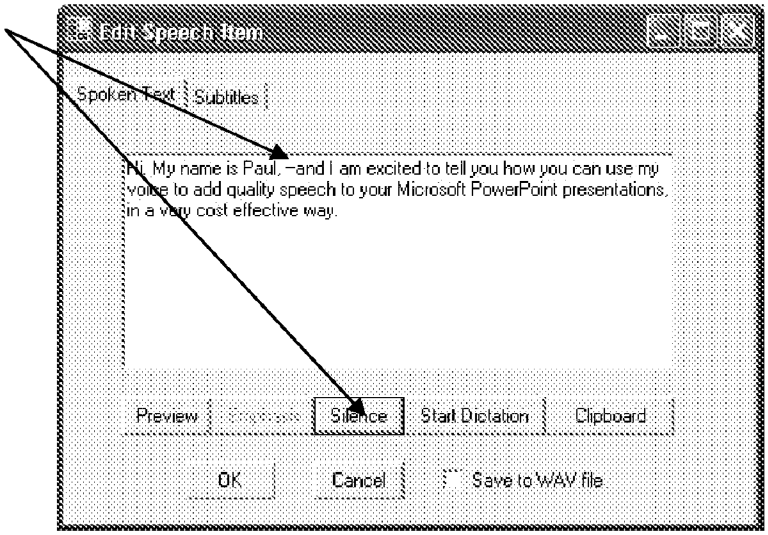
Figure 26 Edit Speech - Inserting a Silence into the Text

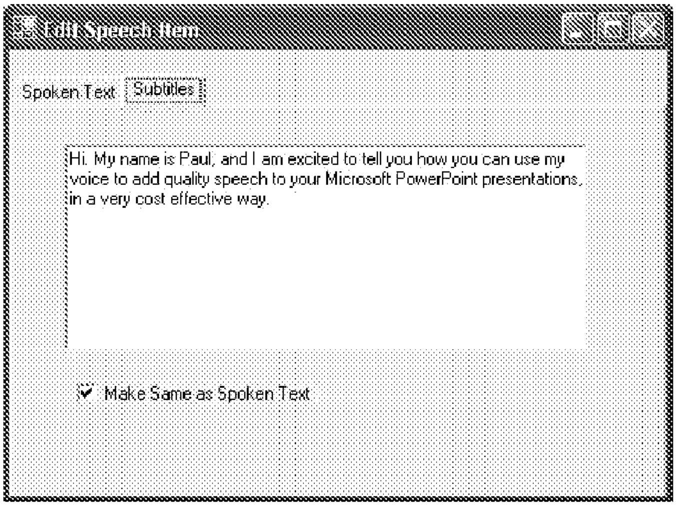
Figure 27 Edit Speech - Subtitle Text Editor
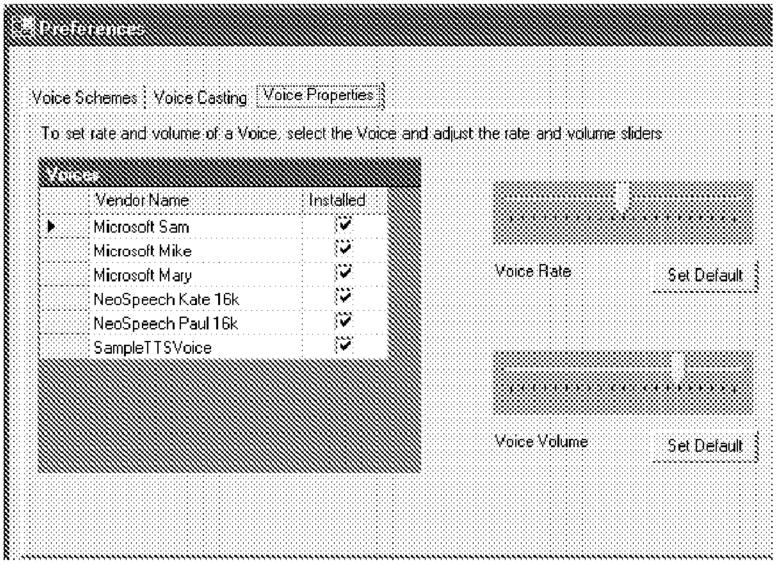
Figure 28 Preferences - Setting Voice Rate and Volume

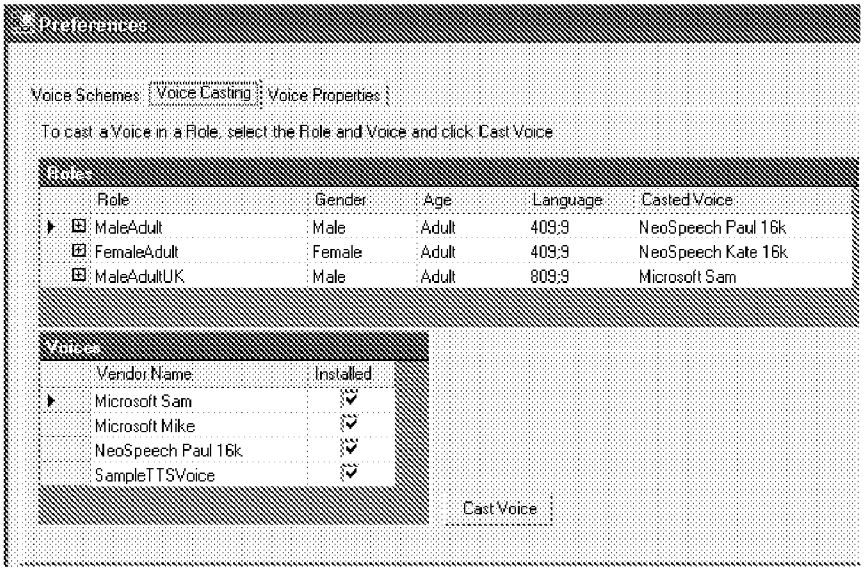
Figure 29 Preferences - Casting a Voice in a VoiceRole
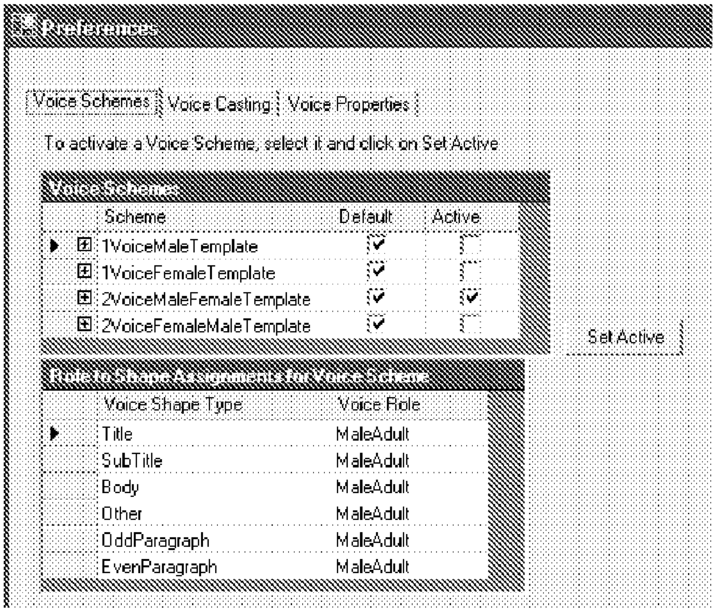
Figure 30 Preferences - Selecting a VoiceScheme

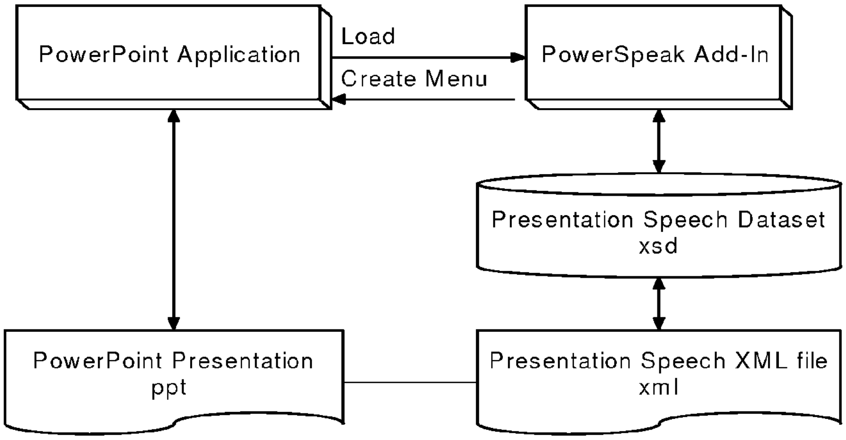
Figure 31 System Diagram
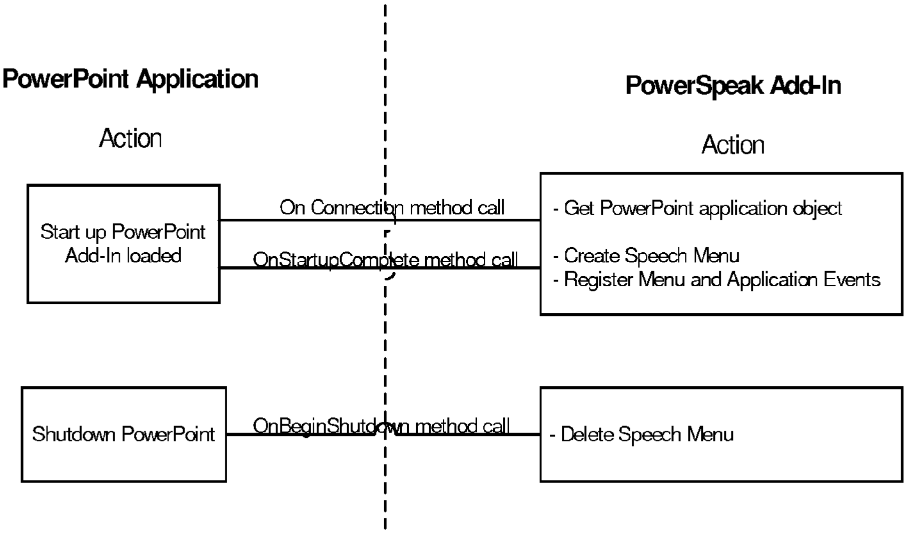
Figure 32 PowerPoint Connect Method Calls

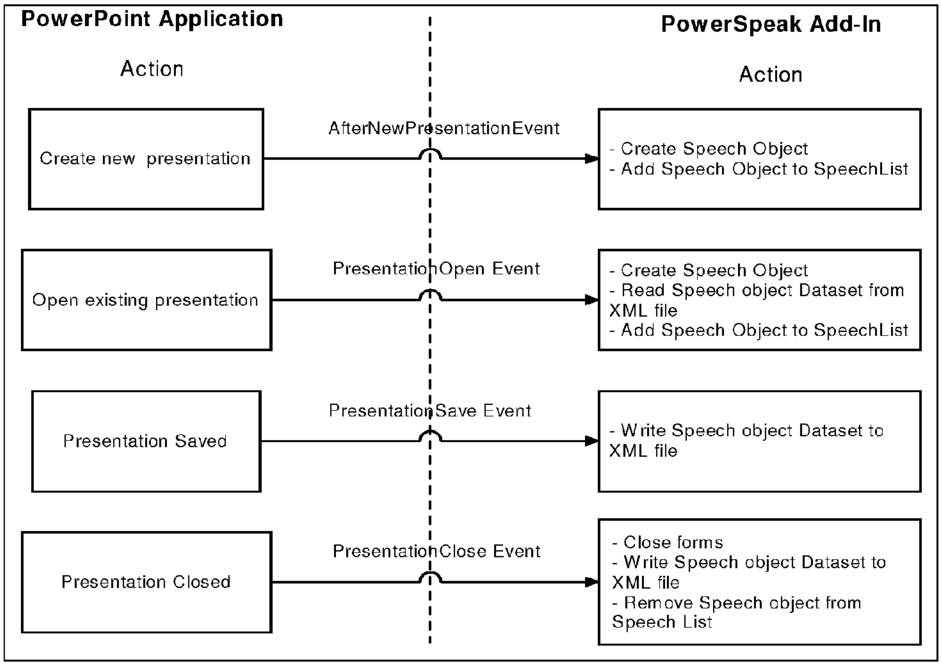
Figure 33 Speech Object Creation Event Processing

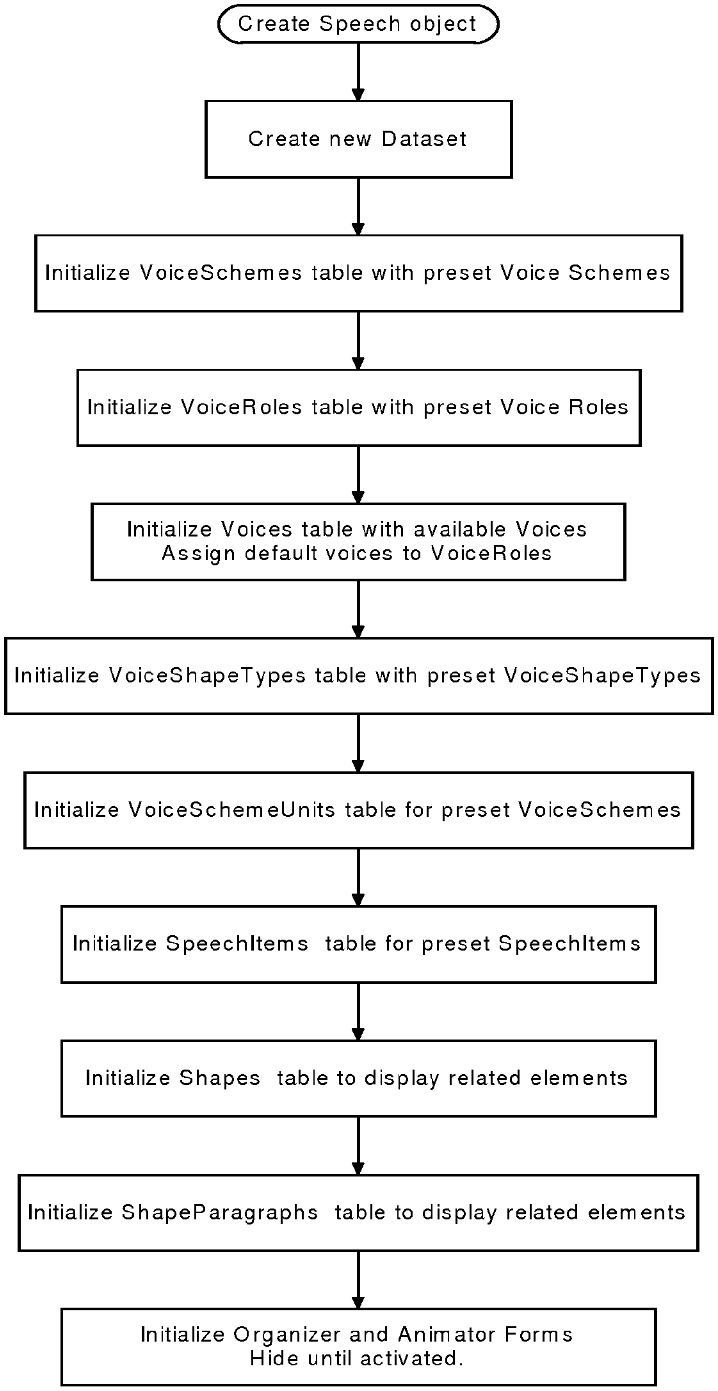
Figure 34 Speech Object Constructor Flow

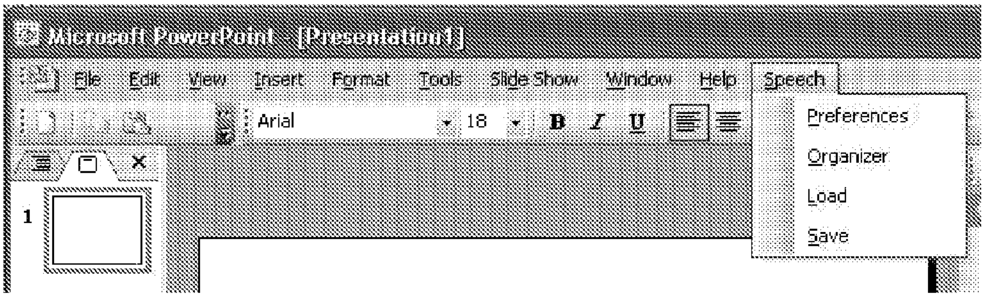
Figure 35 Speech Menu
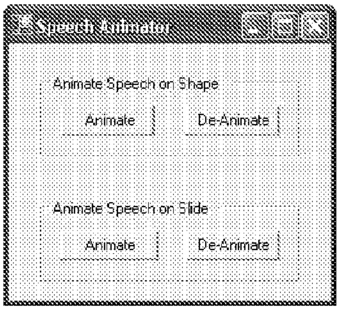
Figure 36 Speech Animator Form
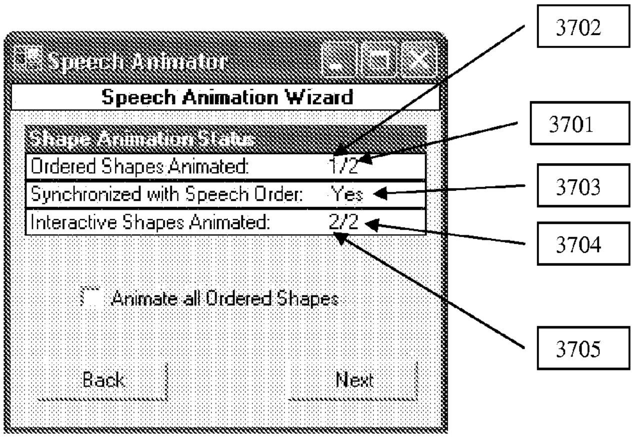
Figure 37 Animation Status Display

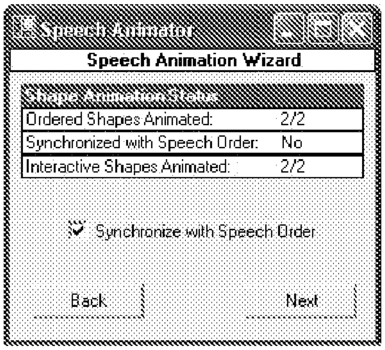
Figure 38 Synchronizing with the Speech Order
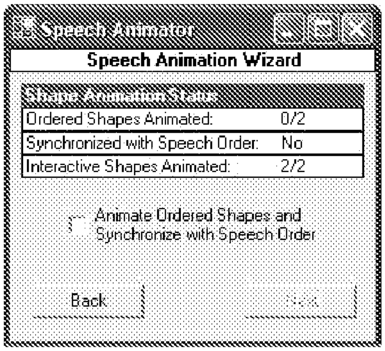
Figure 39 Automatic Shape Animation for all Ordered Shapes
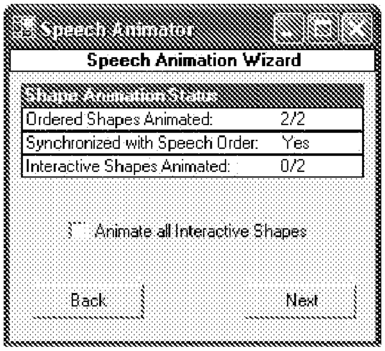
Figure 40 Automatic Shape Animation for all Interactive Shapes

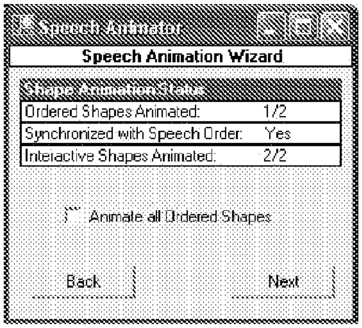
Figure 41 Automatic Shape Animation for Some Shapes
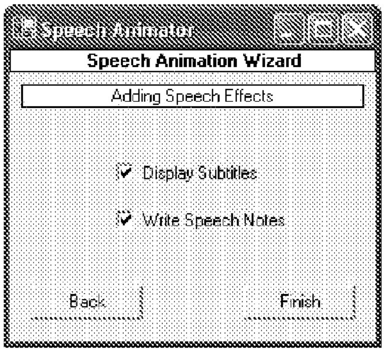
Figure 42 Launch Speech Animation Screen
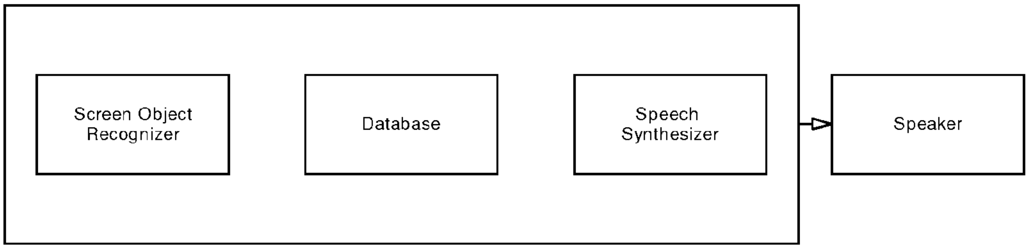
Figure 43 System Diagam

SPEECH DERIVED FROM TEXT IN COMPUTER PRESENTATION APPLICATIONS

| | | | | |
|---|---|---|---|---|
| A | U.S. Pat. No. 6,161,091 | December 2000 | Akamine et al. | 704/258 |
| B | U.S. Pat. No. 6,252,588 | June 2001 | Dawson, John | 715/752 |
| C | U.S. Pat. No. 6,324,511 | November 2001 | Kiraly et al. | 704/260 |
| D | U.S. Pat. No. 6,446,041 | September 2002 | Reynar et al. | 704/260 |
| E | U.S. Pat. No. 6,975,988 | December 2005 | Roth et al. | 704/260 |
| F | U.S. Pat. No. 7,120,583 | October 2006 | Kaneko et al. | 704/260 |
| G | U.S. Pat. No. 7,194,411 | March 2007 | Slotznick et al. | 704/271 |
| H | U.S. Pat. No. 7,412,389 | August 2008 | Yang, George L. | 704/260 |
| I | US-2002/0072906 | June 2002 | Koh, Jocelyn K. | 704/260 |
| J | US-2002/0099549 | July 2002 | Nguyen, Khang Kv. | 704/270 |
| K | US-2003/0128817 | July 2002 | Myers et al. | 379/67.1 |
| L | US-2004/0059577 | March 2004 | Pickering, John B. | 704/260 |
| M | US-2006/0100877 | May 2006 | Zhang et al. | 704/260 |
| N | US-2006/0143559 | June 2006 | Spielberg et al. | 715/512 |

Israel Patent Application 168400; Filing Date May 4, 2005

1. BACKGROUND

It is well known that visual animation of screen objects makes a computer-based visual presentation more effective. Adding voice narration to a computer-based visual presentation can further enhance the presentation, especially if the voice is coordinated with animation of the screen objects. Presentation software such as Microsoft® PowerPoint® and Macromedia® Breeze® allow the user to attach and coordinate voice narration from sound files produced by human voice recording. Speech derived from text has advantages over human voice recording for producing voice narration: it is easier to create, update and maintain. The VoxProxy® application uses Microsoft Agent® technology to add cartoon characters with text-based speech to a PowerPoint slide show. The PowerTalk application allows text-based speech to be attached to non-text screen objects on a PowerPoint slide. The PowerTalk application can read the text of text screen objects, such as a bullet paragraph, but cannot add narration over and above what is already written.

Software applications do not exist that can add speech derived from text to a presentation, including: (1) Link speech text to any screen object in a presentation. (2) Enter and edit speech text efficiently, (3) Link multiple voices to screen objects in a general and efficient way, (4) Animate the speech for screen objects that have ordered or interactive visual animations defined for them.

2. SUMMARY OF THE INVENTION

The current embodiment of the present invention involves a method of adding speech derived from text to presentations including visual screen objects.

The current embodiment of the present invention also involves a system for adding speech derived from text to presentations including visual screen objects, comprising a screen object recognizer, a database relating characteristics of speech including speech text and selection of voice, to screen objects, and a speech synthesizer, which outputs to a speaker.

In a first aspect, the present invention relates to a computer system comprising hardware and software elements; the hardware elements including a processor, a display means and a speaker, the software elements comprising a speech synthesizer, a database platform and a software application comprising a methodology of inputting and tabulating visual elements and verbal elements into the database, links for linking the visual elements and verbal elements; operations for manipulating the database and for enunciating the verbal elements as the corresponding visual elements are displayed on the display means.

In a second aspect, the present invention is directed to providing a method for enhancing a visual presentation by adding a soundtrack thereto thereby converting the visual presentation into an audiovisual presentation, said soundtrack including at least a first verbal element linked to at least a first screen element. The method including the following steps:

- Providing a computer system comprising hardware and software elements; the hardware elements including a processor, a display means and a speaker, the software elements comprising a speech synthesizer, a database platform and a software application comprising a methodology of inputting and tabulating visual elements and verbal elements into the database, links for linking the visual elements and verbal elements; operations for manipulating the database and for enunciating the verbal elements as the corresponding visual elements are displayed on the display means;
- Providing a visual presentation comprising visual elements;
- Tabulating the visual elements as a visual element table;
- Tabulating desired verbal elements as a verbal element table;
- Linking at least a first verbal element to a first visual element, and
- Enunciating the at least a first verbal element when a first visual element is displayed.

Preferably, the verbal elements comprise at least a first speech synthesizable syllable.

Optionally, the at least a first speech synthesizable syllable is inputted by typing an alphanumeric string into a dialog box for subsequent recognition by a speech synthesizer.

Optionally, the at least a first speech synthesizable syllable is inputted by talking into a voice recognition system.

Alternatively, the at least a first visual element comprises written words.

Optionally, the at least a first visual element comprises a graphic element.

In some embodiments, the database includes a plurality of roles and each verbal element is assignable to a role.

In some embodiments, the database includes a plurality of roles and each visual element is assignable to a role.

Preferably, each of said roles is assigned an audibly distinguishable voice.

Optionally and preferably, each of said roles comprises characteristics selected from the list of: age, gender, language, nationality, accentably distinguishable region, level of education, cultural . . . .

Optionally the soundtrack includes a plurality of verbal elements and the method includes assigning a voice to speak each verbal element.

3. TERMINOLOGY

To explain the present invention, reference is made throughout to Microsoft PowerPoint, Microsoft .NET Framework including .NET Framework Dataset database objects, and SAPI text-to-speech technology. The terminology used to describe the invention is taken in part from those applications. The invention may, however, be implemented using other platforms.

The present invention is hereinafter referred to as the "Program".

4. BRIEF DESCRIPTION OF FIGURES

FIG. 1 Overall Diagram of Dataset Data Tables
FIG. 2 Speech Organizer Form—Ordered Shapes Display
FIG. 3 Relation between Shapes and ShapeParagraphs Tables
FIG. 4 Speech Organizer Form—Paragraphs Display
FIG. 5 Speech Organizer Form—Interactive Shapes Display
FIG. 6 Relation between SpeechItems and Shapes
FIG. 7 Assigning Voices to Shapes by a Voice Scheme
FIG. 8 Relation between Voice Roles and Voices
FIG. 9 Relation between VoiceRoles and Shapes
FIG. 10 Relation between VoiceShapeTypes and Shapes
FIG. 11 Relation between VoiceSchemes, VoiceScheme Units Voice Roles and VoiceShapeTypes
FIG. 12 Speech Organizer Form
FIG. 13 Speech Organizer Events
FIG. 14 Add Speech Item Dialog
FIG. 15 Add SpeechItem Flow 1
FIG. 16 Add SpeechItem Flow 2
FIG. 17 Edit Speech Item Dialog
FIG. 18 Edit Speech Item Flow
FIG. 19 Delete SpeechItem Flow
FIG. 20 Sync Paragraphs Function Flow
FIG. 21 Voice Role Assignment Dialog
FIG. 22 Role Function Flow
FIG. 23 Edit Speech—Emphasis Button Enabled for Selected Regular Text
FIG. 24 Edit Speech—Emphasized Text in Italics
FIG. 25 Edit Speech—Emphasis Button Enabled for Italicized Text
FIG. 26 Edit Speech—Inserting a Silence into the Text
FIG. 27 Edit Speech—Subtitle Text Editor
FIG. 28 Preferences—Setting Voice Rate and Volume
FIG. 29 Preferences—Casting a Voice in a VoiceRole
FIG. 30 Preferences—Selecting a VoiceScheme
FIG. 31 System Diagram
FIG. 32 PowerPoint Connect Method Calls
FIG. 33 Speech Object Creation Event Processing
FIG. 34 Speech Object Constructor Flow
FIG. 35 Speech Menu
FIG. 36 Speech Animator Form
FIG. 37 Animation Status Display
FIG. 38 Synchronizing with the Speech Order
FIG. 39 Automatic Shape Animation for all Ordered Shapes
FIG. 40 Automatic Shape Animation for all Interactive Shapes
FIG. 41 Automatic Shape Animation for Some Shapes
FIG. 42 Launch Speech Animation Screen
FIG. 43 System Diagam

5. OVERVIEW OF THE EMBODIMENTS 5.1.1.1. Linking Speech Text to Screen Objects The current embodiment of the present invention involves a software program that provides database data structures, operations on data, and a user interface to allow speech text and subtitles to be defined and linked with individual screen objects on computer presentation software applications such as Microsoft PowerPoint. Speech can be attached to any kind of screen object including, placeholders, pictures, Autoshapes, text boxes, and individual paragraphs in a text frame.

The parent-child link between speech text and screen object makes it possible to assign the same standard speech text to multiple screen objects.

5.1.2. Entering and Editing Speech Text

A novel speech text editor lets the user enter and edit the speech text and insert and remove voice modulation (SAPI) tags. The voice modulation tags are represented by simple text graphics; the user only works with the graphic representation and not with the tags themselves. Subtitle text is edited separately.

5.1.3. Linking Multiple Voices to Screen Objects

Multiple text-to-speech voices can be used in a presentation, where the voice that speaks the text of one screen object can be different from the voice that speaks the text of another screen object. The present invention also addresses the issue of how to assign multiple voices to screen objects in a general and efficient way that also makes the presentation more effective.

The idea of the solution is to assign one voice to all screen objects of the same type. For example, in a PowerPoint presentation, a male voice, Mike, would speak all text attached to Title text shapes, and a female voice, Mary, would speak all text attached to Subtitle text shapes. In another example, Mike would speak all text attached to odd paragraph text shapes, and Mary would speak all text attached to even paragraph text shapes.

The current embodiment of the present invention provides database data structures, operations on data, and a user interface to allow multiple voices to be linked with individual screen objects in a general and efficient way as described. The following additional voice data structures are used: voice roles, voice shape types and voice schemes.

5.1.3.1. Voice Role

Vendor voices are not linked directly to screen objects but rather they are represented by voice roles that are linked to screen objects. The voice role data structure abstracts the characteristics of a vendor voice such as gender, age and language. For example, one voice role could be (Male, Adult, US English). The voice role removes the dependence on any specific vendor voice that may or may not be present on a computer.

5.1.3.2. Voice Shape Type

The voice shape type data structure allows you to associate one voice role with a set of different screen object types. Screen objects are classified by voice shape type where more than one screen object type can be associated with one voice shape type, and then the voice role is associated with the voice shape type. For example, in PowerPoint, a male voice role can speak the text of both Title text objects and Subtitle text objects if they are both associated with the same voice shape type.

5.1.3.3. Voice Scheme

The voice scheme data structure serves the purpose of associating voice roles with voice shape types.

Thus, as described, a voice role can be associated with the text of a screen object in a general way by the mechanism of a voice scheme. In addition, to handle exceptional cases, the present invention provides for a direct association between a voice role and the text attached to a specific screen object, such direct association overriding the voice scheme association.

All definitions and links for speech and voice in a presentation can be saved in an xml text file and subsequently reloaded for change and editing.

5.1.4. Animating the Speech in a Presentation

Once the speech items and voice roles are defined and linked to the screen objects, the speech can be animated for screen objects that have visual animation effects defined for them. Briefly, speech is animated for a screen object by (1) generating a text-to-speech sound file from the screen object's speech text and voice, (2) creating a media effect, which can play the sound file and (3) coordinating the media effect with the object's visual animation effect.

There are two types of speech animation: ordered and interactive.

Ordered speech and subtitle animation effects are generated and coordinated with the screen objects' visual animation effects in the slide main animation sequence and can be triggered by screen clicks (page clicks) or time delays.

Interactive animation speech and subtitle effects are generated and coordinated with the screen objects' visual effects in the slide interactive animation sequences and are triggered by clicking the screen object.

Since the animation speech can be stored in standard sound files, the slide show can be run by PowerPoint alone without the Program. Such a speech-animated slide show can be effective, for example, for educational presentations.

5.1.5. Speech Notes—Editing Speech Text without the Program

The animation procedure can generate a Speech Notes document that includes all the speech items on a slide in their animation order. The document can be stored in the PowerPoint Notes pane to provide a medium for editing all speech items in the presentation without using the Program. The Program can merge the edited speech items back into the respective data structure.

5.2. Flow Charts

To aid those who are skilled in the art, for example, computer programmers, in understanding the present invention, references are made in the description to flow charts, which are located in the figures section. The flow charts, a common means of describing computer programs, can describe parts of the present invention more effectively and concisely than plain text.

6. PROGRAM DATA ORGANIZATION

This section discusses the organization of the Program data. The next section, Operations on Data Tables, describes the Program operations on the data.

Although the current embodiment of the invention is for the Microsoft PowerPoint software, the information discussed in this section is generally applicable to presentation software other than Microsoft PowerPoint and to stand-alone applications, see section Operations on Data Tables.

6.1. Dataset Database

An important part of the Program is the way the data is stored in a relational database, as tables in a .Net Framework Dataset and displayed in data-bound Windows Data Forms such as Datagrid. This method of storage and display has the following advantages:

- Allows representation of parent-child relations among the data
- Data binding to controls, such as Datagrid or ComboBox allows direct access to the database elements through the control.
- Data binding allows displaying and selecting related data elements easily on multiple Datagrid controls.
- Xml based—the Dataset can be written as an external xml text file for easy storage and transmission and can be loaded from it 6.1.1. Database Tables The following sections discuss the DataTables that make up the Dataset of the Program and the parent-child relations between the tables. FIG. 1 shows the entire Dataset of the Program where the arrow directions show the parent-child relations between the tables.

To better understand the structure of the Dataset of the Program, it is convenient to divide its Data Tables into three groups:

- Screen Object Data Tables—Represents the screen objects to which speech is attached.
- Speech Item Data Table—Represents the speech and subtitles attached to a screen object
- Voice Data Tables—Pertains to how actual text-to-speech voices are selected and used to speak the Speech Items attached to screen objects In addition, the Program includes a Document Control Table, which includes document control information relevant to the presentation, such as organization, creation date, version, language and other relevant information similar to that in the File/Properties menu item of Microsoft Word®. The language element in the Document Control Table defines the language (US English, French, German, etc) to be used for the text-to-speech voices in the presentation. This information is displayed to the user in the Properties menu item.

6.2. Database Tables for Screen Objects

For the purpose of attaching speech items, screen objects are represented by database tables according three categories:

- Ordered Shapes—Ordered Shapes are defined for speech items that are to be spoken once in a predefined animation sequence during the presentation slide show, for example on successive screen clicks on a slide. As each Ordered Shape is animated in sequence, its attached speech item is spoken. Each Ordered Shape has an order number that determines its place in the animation sequence. An Ordered Shape can be any screen object except a text frame paragraph. Ordered Shapes are represented by the Shapes Table described below.
- Ordered Shape Paragraphs—Ordered Shape Paragraphs are defined for speech items that are to be spoken on animation of text frame paragraphs. To attach a speech item to an individual text frame paragraph, the parent shape that contains the text frame is defined as an Ordered Shape and the text frame paragraph is defined as an Ordered Shape Paragraph. When the parent Ordered Shape is animated according to its animation order, its child Ordered Shape Paragraphs are animated in the order the paragraphs are written in the text frame. When each Ordered Shape Paragraph is animated, its attached speech item is spoken. The parent Ordered Shape does not necessarily have a speech item attached to it directly but if it does, it is spoken first. Ordered Shape Paragraphs are represented by the ShapeParagraphs Table described below.
- Interactive Shapes—Interactive Shapes are defined for speech items that are to be spoken interactively on clicking the shape on a slide during the presentation slide show. Interactive Shapes do not need to be activated in a specific order and can be activated any number of times. An Interactive Shape can be any screen object except a text frame paragraph. Interactive Shapes are represented by the InterShapes Table described below.

6.2.1. Shapes Table

A Shapes table row (called hereinafter "Shape") represents an individual screen object to which an ordered SpeechItem has been attached. The Shapes table includes all screen objects except text frame paragraphs, which are stored in a separate table, the ShapesParagraphs table (see section ShapeParagraphs Table).

Shapes are manipulated using the Speech Organizer user interface which represents all the speech items on a slide, as shown in FIG. 2. Rows of the Shapes table are shown on the Ordered Shapes Datagrid control, where the Order and Display Text elements of each Shape are shown.

6.2.2. Shapes Table Elements

The Shapes table has the following row elements

TABLE 1

| Name | Type | Description |
|---|---|---|
| Id | int | Id of Shape |
| Slide Id | int | The Id of the PowerPoint slide containing the shape |
| ShapeName | string | The PowerPoint name of the shape |
| VoiceShapeType | enum | The voice type of the Shape (Title, SubTitle, Body, Other, OddParagraph, EvenParagraph). This element determines the voice used for this Shape, according to the selected Voice Scheme. |
| Order | int | This element determines the order of this shape in the animation sequence for this Slide. A zero value is the first in order. |
| SpeechItem Id | int | The Id of the Speech Item attached to this Shape |
| SpeechItemText | string | Spoken text of the Speech Item attached to this Shape |
| SpeechStatus | Enum | The status of the Speech Item attached to this Shape (NoSpeechItem, SpeechOnShapeOnly, SpeechOnParagraphOnly, SpeechOnShapeAndParagraph). Used to denote where the SpeechItem is attached for shapes that have text frames. |
| HighlightShapeTypeId | int | Reserved for use in speech player. |
| SpeechItemTextNoTags | string | Display text (subtitle) of the Speech Item attached to this Shape |
| DirectVoiceRoleId | int | Id of Voice Role used for this Shape when Voice Scheme is not used for this Shape. |
| DirectVoiceRole | string | Name of Voice Role used for this Shape when Voice Scheme is not used for this Shape |
| DirectVoiceRoleEnabled | boolean | Flag to determine when the Direct Voice Role is enabled for this Shape. |

6.2.3. ShapeParagraphs Table

A ShapeParagraphs table row (called hereinafter "ShapeParagraph") represents an individual text frame paragraph screen object to which a SpeechItem has been attached.

6.2.4. ShapeParagraphs Table Elements

A ShapeParagraph has the same elements as a Shape in the previous section except for the following additional elements.

TABLE 2

| Name | Type | Description |
|---|---|---|
| ParaNum | int | The paragraph number of the paragraph corresponding to this ShapeParagraph in the text frame |
| ShapesId | int | The Id of the parent Shape of this ShapeParagraph |

6.2.4.1. Relation Between Shapes and Shapeparagraphs Tables

Text frame paragraphs are considered children of the shape that contains their text frame, for example, paragraphs of a placeholder or text box. Accordingly, a parent-child relation is defined between the Shapes table (see section Shapes Table) and the ShapeParagraphs table. FIG. 3 shows the parent-child relation between the Shapes and ShapeParagraphs table.

FIG. 3 will now be explained in detail; all similar figures will be understood by referring to this explanation. The Shapes table (301) and the ShapeParagraphs table (302) have a parent-child relation denoted by the arrow (305) in the direction of parent 4 child. The related elements of each table are shown at the ends of the arrow: the Id element (303) of the parent table Shapes is related to the ShapesId element (304) of the child table ShapeParagraphs.

A parent-child relation means that a parent Shape with element Id=Id0 can correspond to many child ShapeParagraphs with the same element ShapeId=Id0.

FIG. 4 shows the ShapeParagraphs rows displayed in the Paragraphs Datagrid of the Speech Organizer form. The Shapes and ShapeParagraphs tables' data are bound to their respective Datagrid displays using data binding. Thus, when the parent Shape is selected in the Shapes Datagrid, the child ShapeParagraphs rows for that Shape are automatically displayed in the Paragraphs Datagrid because of their parent-child relation. The parent Shape, when there is no speech item attached to it directly, displays the speech text "Speech in Paragraphs" to denote that the speech items of its children are displayed in the Paragraphs Datagrid.

6.2.5. InterShapes Table

An InterShapes Table row (called hereinafter "InterShape") represents an individual screen object to which an interactive SpeechItem has been attached. The InterShapes table can include all screen objects except text frame paragraphs, which are not relevant for interactive speech items.

InterShapes are manipulated using the Speech Organizer user interface, as shown in FIG. 5. Rows of the InterShapes table are shown on the Interactive Shapes Datagrid control, where the Display Text elements of each InterShape are shown.

6.2.6. InterShapes Table Elements

The InterShapes table has the following row elements

TABLE 3

| Name | Type | Description |
|---|---|---|
| Id | int | Id of Shape |
| Slide Id | int | The Id of the PowerPoint slide containing the shape |
| ShapeName | string | The PowerPoint name of the shape |
| VoiceShapeType | enum | The voice type of the Shape (Title, SubTitle, Body, Other, OddParagraph, EvenParagraph). This element determines the voice used for this Shape, according to the selected Voice Scheme. |
| SpeechItem Id | int | The Id of the Speech Item attached to this Shape |
| SpeechItemText | string | Spoken text of the Speech Item attached to this Shape |
| SpeechStatus | Enum | The status of the Speech Item attached to this Shape (NoSpeechItem, SpeechOnShapeOnly, SpeechOnParagraphOnly, SpeechOnShapeAndParagraph). Used to denote where the SpeechItem is attached for shapes that have text frames. |

TABLE 3-continued

| Name | Type | Description |
|---|---|---|
| HighlightShapeTypeId | int | Reserved for use in speech player. |
| SpeechItemTextNoTags | string | Display text (subtitle) of the Speech Item attached to this Shape |
| DirectVoiceRoleId | int | Id of Voice Role used for this Shape when Voice Scheme is not used for this Shape. |
| DirectVoiceRole | string | Name of Voice Role used for this Shape when Voice Scheme is not used for this Shape |
| DirectVoiceRoleEnabled | boolean | Flag to determine when the Direct Voice Role is enabled for this Shape. |

6.3. Speech Items

The Speech Item is the basic unit of spoken text that can be attached to a screen object. A Speech Item is defined independently of the screen object, and includes the spoken text and the subtitle text. As described below, a SpeechItem has a parent-child relation to a screen object, so that the same Speech Item can be attached to more than one screen object.

6.3.1. Global Speech Items

A Speech Item that is intended to be attached to more than one screen object is denoted as "global". A global Speech Item is useful, for example, in educational presentations for speaking the same standard answer in response to a button press on different answer buttons.

6.3.2. SpeechItems Table

A SpeechItems table row represents the Speech Item attached to an individual screen object (a SpeechItems table row is called hereinafter a "Speech Item").

6.3.3. SpeechItems Table Elements

A SpeechItems table row contains the following elements:

TABLE 4

| Name | Type | Description |
|---|---|---|
| Id | Int | Id of SpeechItem |
| SpokenText | String | The speech text to be read by the text to speech processor, which can contain voice modulation tags, for example, SAPI tags |
| DisplayText | String | Display text to be shown as a subtitle on the screen at the same time the speech text is heard. This text does not contain SAPI tags. |
| MakeSame | Boolean | A flag determining if the display text should be kept the same as the speech text, after removing the SAPI tags |
| Global | Boolean | A flag determining if this speech item is to be referenced by more than one Shape, ShapeParagraph or InterShape |

6.3.3.1. Relations Between Speechitems and the Shapes, Shapeparagraphs and InterShapes Tables FIG. 6 shows the parent-child relation between the SpeechItems and the Shapes, ShapeParagraphs and InterShapes tables. A parent SpeechItem with element Id=Id0 can correspond to many child Shapes, ShapeParagraphs and InterShapes with the same element value SpeechItemId=Id0. This database relation represents the parent-child relation that exists between a SpeechItem and screen objects of any kind. Using this relation, the unique SpeechItem for a Shape can be accessed as a row in the parent table.

6.3.3.2. Summary of Relation Between SpeechItem and the Shapes, ShapeParagraphs and InterShapes Tables

TABLE 5

| Parent Table | Parent Element | Child Table | Child Element |
|---|---|---|---|
| SpeechItems | Id | Shapes, ShapeParagraphs, InterShapes | SpeechItemId |
| Shapes | Id | ShapeParagraphs | ShapesId |

6.4. Voice Data Tables

The remaining tables in the Dataset pertain to how actual text-to-speech voices are selected and used to speak the Speech Items attached to Shapes, ShapeParagraphs and InterShapes (see Linking Multiple Voices to Screen Objects in the Overview of the)

6.4.1. Overview

The following data table definitions are used: Voices, VoiceRoles, VoiceShapeTypes, VoiceSchemeUnits and VoiceSchemes.

6.4.1.1. Voices and Voice Roles

The Voices table represents the actual vendor text-to-speech voices, like Microsoft Mary. A Voice is never attached directly to a Shape or ShapeParagraph. Rather, it is attached to (cast in) a VoiceRole. The reason is that a VoiceRole definition, like MaleAdult, remains the same for all computers whereas a specific vendor Voice may or may not be installed on a specific computer. However, there will usually be a male adult Voice from some vendor installed on a computer that can be assigned to the MaleAdult Voice Role.

A Voice Role is normally assigned to a Shape, a ShapeParagraph or an InterShape through a Voice Scheme, but it can optionally be assigned directly.

6.4.1.2. Voice Shape Types

The Voice Shape Type establishes types or categories for screen objects for the purpose of assigning Voice Roles to them. The set of VoiceShapeTypes covers all possible screen objects, so that any screen object has one of the Voice Shape Types. A Voice Role is assigned to a screen object by assigning the Voice Role to the screen object's Voice Shape Type. For example, if the set of VoiceShapeTypes is: {Title, SubTitle, OddParagraph, EvenParagraph, and Other}, then you could assign a MaleAdult Voice Role to Title and OddParagraph, and a FemaleAdult Voice Role to Subtitle, EvenParagraph and Other. Then, every time a text Title is animated, the Voice that is cast in the MaleAdult Voice Role will be used for its speech, and anytime an AutoShape (Other) is animated, the Voice that is cast in the FemaleAdult Voice Role will be used.

6.4.1.3. Voice Scheme Units and Voice Schemes

Each assignment of a Voice Role to a VoiceShapeType is called a VoiceSchemeUnit and the collection of all VoiceSchemeUnits for all VoiceShapeTypes constitutes the VoiceScheme.

6.4.1.4. Retrieving a Voice for a Shape

FIG. 7 shows schematically in a table how the Voices are assigned to the Shapes and ShapeParagraphs. The Voice Scheme is denoted by the double line, which encloses the collection of VoiceRole-VoiceShapeType pairings.

6.4.1.5. Voice Assigned to a Shape

The table rows left to right (arrows on first row) show how the actual Voice is assigned to a Shape:

(1) The Voice is cast in a Voice Role, (2) The Voice Role is assigned to a VoiceShapeType by the Voice Scheme (3) The VoiceShapeType is assigned to the Shape or ShapeParagraph.

6.4.1.6. Voice Retrieved for a Shape

In normal Program operation, the Voice assigned to a Shape is sought so that the association proceeds in the opposite direction in the table (right to left, see arrows on the second row):

(1) Gets the VoiceShapeType assigned to the Shape or ShapeParagraph from VoiceShapesTypes table (2) Gets the Voice Role assigned to a VoiceShapeType by the active Voice Scheme in the VoiceSchemes and VoiceSchemeUnits tables (3) Gets the Voice that was cast in the Voice Role from the CastedVoiceName element of the VoiceRoles table.

6.4.2. Voices Table

A Voices table row (a Voices table row is called hereinafter "Voice") represents the actual voice data for a vendor voice (see section Voices and Voice Roles).

6.4.3. Voices Table Elements

A Voice has the following elements:

TABLE 6

| Name | Type | Description |
|---|---|---|
| Id | int | Id of the Voice |
| VendorVoiceName | string | Name of Voice assigned by vendor, e.g., Microsoft Mary |
| Gender | string | Gender of Voice, male, female |
| Age | string | Age of Voice, e.g., child, adult |
| Language | string | Voice Language (language code) e.g. US English 409;9 |
| Vendor | string | Name of Voice vendor, e.g., Microsoft |
| CustomName | string | Name of Voice for custom voice |
| Rate | int | Rate of Voice |
| Vol | int | Volume of Voice |
| IsCustom | boolean | True if this Voice is a custom voice |
| IsInstalled | boolean | True if Voice installed on current computer |

6.4.4. VoiceRoles Table

The Voice Role represents a Voice by abstracting its gender, age, and language; examples of Voice Roles are MaleAdult and FemaleAdultUK. The role could be filled or cast by any one of a number of actual voices (see above section Voices and Voice Roles).

Voice Roles are preset or custom.

6.4.5. VoiceRoles Table Elements

The VoiceRoles table has the following elements (a VoiceRoles table row is called hereinafter "Voice Role"):

TABLE 7

| Name | Type | Description |
|---|---|---|
| Id | int | Id of the VoiceRole |
| Name | string | Name of the VoiceRole |
| CastedVoiceName | string | Actual Voice assigned to this VoiceRole |
| VoiceGender | string | Gender of this VoiceRole |
| VoiceAge | boolean | Age of this VoiceRole |
| VoiceLanguage | string | Language of this VoiceRole |
| VoiceRole | string | VoiceRole name |
| VoiceCharacterType | int | Character type for this VoiceRole |
| CastedVoiceId | int | Id of Voice assigned to this VoiceRole |
| RoleIconFile | string | Icon file containing graphic icon representing this VoiceRole |

6.4.5.1. Relation Between VoiceRoles and Voices Tables

FIG. 8 shows the parent child relation between the VoiceRoles and the Voices tables. A parent VoiceRole with elements VoiceGender, VoiceAge, VoiceLanguage can correspond to many child Voices with the same element values Gender, Age, Language. This database relation represents the parent-child relation that exists between a VoiceRole and the multiple voices that can be cast in it—that is, any Voice that has the gender, age and language required for the VoiceRole. Using the relation, when a VoiceRole is selected on its DataGrid, all the Voices that could be cast in the VoiceRole are displayed automatically.

6.4.5.2. Relation Between VoiceRoles and the Shapes, ShapeParagraphs and InterShapes Tables FIG. 9 shows the parent child relation between the VoiceRoles and the Shapes, ShapeParagraphs and InterShapes tables. A parent VoiceRoles with element Id=Id0 can correspond to many child Shapes, ShapeParagraphs and InterShapes with the same element value DirectVoiceRoleId=Id0. In this relation, the children of a VoiceRole are all Shapes, ShapeParagraphs and InterShapes that have that VoiceRole assigned to them directly.

6.4.6. VoiceShapeTypes Table

A Voice Shape Type is one of a set of types that can be assigned to screen object types, for the purpose of assigning Voice Roles to screen objects by means of a Voice Scheme (see section Voice Shape Types).

6.4.7. VoiceShapeTypes Table Elements

The VoiceShapeTypes table has the following elements (a VoiceShapeTypes table row is called hereinafter "Voice Shape Type"):

TABLE 8

| Name | Type | Description |
|---|---|---|
| Id | int | Id of the VoiceShapeType |
| Description | string | Description of the VoiceShapeType, one of Title, SubTitle, Body, OddParagraph, EvenParagraph, Other |

6.4.7.1. Relations Between VoiceShapeTypes and the Shapes, ShapeParagraphs and InterShapes Tables FIG. 10 shows the parent child relation between the VoiceShapeTypes and the Shapes, ShapeParagraphs and InterShapes tables. A parent VoiceShapeType with element Id=Id0 can correspond to many child Shapes, ShapeParagraphs and InterShapes with the same element value VoiceShapeTypeId=Id0. In this relation, the children of a VoiceShapeType are all Shapes, ShapeParagraphs and InterShapes that have that VoiceShapeType assigned to them.

6.4.8. VoiceSchemeUnits Table

A VoiceSchemeUnit represent a pairing of a VoiceShapeType with a VoiceRole for a specific VoiceScheme. The collection of all pairs for a given VoiceScheme Id constitutes the entire voice scheme (see above section Voice Scheme Units and Voice Schemes).

6.4.9. VoiceSchemeUnits Table Elements VoiceSchemeUnits has the following elements (a VoiceSchemeUnits table row is called hereinafter "Voice Scheme Unit"):

TABLE 9

| Name | Type | Description |
|---|---|---|
| Id | int | Id of the VoiceSchemeUnit |
| VoiceSchemeId | int | Id of VoiceScheme for this VoiceSchemeUnit |
| VoiceShapeTypeId | string | Id of VoiceShapeType for this VoiceSchemeUnit |
| VoiceRoleId | boolean | Id of VoiceRole for this VoiceSchemeUnit |
| VoiceShapeType | string | VoiceShapeType name |
| VoiceRole | string | VoiceRole name |

6.4.10. Voice Schemes Table

A Voice Scheme is a collection of VoiceSchemeUnits for all VoiceShapeTypes (see above section Voice Scheme Units and Voice Schemes). Voice Schemes can be preset or custom.

6.4.11. Voice Schemes Table Elements

The VoiceSchemes table has the following elements (a VoiceSchemes table row is called hereinafter "Voice Scheme"):

TABLE 10

| Name | Type | Description |
|---|---|---|
| Id | int | Id of the VoiceScheme |
| Name | string | name of the VoiceScheme, for example, 1VoiceMaleScheme |
| IsDefault | boolean | The VoiceScheme is preset |
| Active | boolean | The VoiceScheme is active (selected) |

6.4.11.1.

6.4.11.2. Relation Between VoiceSchemes, VoiceScheme Units, Voice Roles and VoiceShapeTypes Tables FIG. 11 shows:

- The parent child relation between the VoiceSchemes and VoiceScheme Units. A parent VoiceScheme with element Id=Id0 can correspond to many child VoiceScheme Units with the same element value VoiceSchemeId=Id0.
- The parent-child relation between the VoiceRoles and the VoiceSchemeUnits tables. A parent VoiceRole with element Id=Id0 can correspond to many child VoiceScheme Units with the same element value VoiceRoleId=Id0.
- The parent-child relation between the VoiceShapeTypes and the VoiceSchemeUnits tables. A parent VoiceShapeType with element Id=Id0 can correspond to many child VoiceScheme Units with the same element value VoiceShapeTypeId=Id0.
- A VoiceRole is paired with a VoiceShapeType when they are parents of the same child VoiceSchemeUnit.

6.4.12. Summary of Relations Between Voice Tables

TABLE 11

| Parent Table | Parent Element | Child Table | Child Element |
|---|---|---|---|
| VoiceSchemes | Id | VoiceSchemeUnits | VoiceSchemeId |
| VoiceRoles | Id | VoiceSchemeUnits | VoiceRoleId |
| VoiceRoles | VoiceGender VoiceAge Voice-Language | Voices | Gender Age Language |
| VoiceRoles | Id | Shapes, ShapeParagraphs, InterShapes | DirectVoiceRoleId |
| VoiceShapeTypes | Id | Shapes, ShapeParagraphs, InterShapes | VoiceShapeTypeId |
| VoiceShapeTypes | Id | VoiceSchemeUnits | VoiceShapeTypeId |

7. OPERATIONS ON DATA TABLES

This section describes the Program operations that can be performed on the Data Tables. The Data Tables themselves are described in the section Program Data Organization. The operations are implemented using the Speech Organizer form and the Preferences form. These forms are only used by way of example; other types of user interfaces could be used to accomplish the same results.

7.1. Operations on Data Tables Through the Speech Organizer Form

The Speech Menu Organizer menu item causes the Speech Organizer for the current slide to be displayed.

The Speech Organizer provides a central control form for displaying and performing operations on the SpeechItems, Shapes, InterShapes, ShapeParagraphs Data Table elements defined for a slide.

Referring to FIG. 12, the Speech Organizer:

- Displays current screen object selection properties (1201)
- Displays associated voice and method of determining voice (scheme or direct role assignment) (1202)
- Displays Shapes (1203), ShapeParagraphs (1204) and InterShapes (1206) for the slide, together with their SpeechItems.
- Provides button controls for operations on Shapes, ShapeParagraphs and InterShapes. (1205). A different implementation could initiate operations by drop-down menus at the top of the form and right-click context menus on row selection.

7.1.1. Speech Organizer Refresh

The Speech Organizer is refreshed by PowerPoint application event handlers, when the PowerPoint user:

- Selects a different slide (Slide Selection Changed)
- Selects a different screen object on the same slide (Window Selection Changed) as shown in FIG. 13.

7.1.2. Connection Between Powerpoint Screen Selection and the Speech Organizer Datagrid Selection When a PowerPoint screen object is selected, the corresponding Shape, ShapeParagraph or InterShape DataGrid row on the Speech Organizer is selected and vice versa, as follows:

- Selecting (for example, by Mouse Click) a Shape, ShapeParagraph or InterShape Datagrid Control row selects the screen object on PowerPoint screen corresponding to the Shape, ShapeParagraph or InterShape Datagrid row clicked.
  - Procedure: the ShapeName and ParaNum of the selected Datagrid row is used to get the corresponding PowerPoint shape and paragraph and to select it.
- Selecting (for example, by Mouse Click) a screen object on the PowerPoint screen affects the Speech Organizer as follows: If the selected screen object has a SpeechItem attached to it, the corresponding Shape, ShapeParagraph or InterShape row on the Datagrid controls is selected, the Edit button is activated and the Add button deactivated. If the selected screen object does not have a SpeechItem attached to it, the Add button is activated and the Edit button deactivated. (operates through the Window Selection Changed event as shown in FIG. 13).
  - Procedure: In the Window Selection Changed event handler, obtain the shape name and paragraph number from the selected PowerPoint screen object. Search the Speech Organizer DataGrids for a row with the same ShapeName and ParaNum. If found, select it and activate Edit, if not found, activate Add.

7.1.3. SpeechItems, Shapes, InterShapes, ShapeParagraphs Data Table Operations

The following operations can be performed on the SpeechItems, Shapes, InterShapes, ShapeParagraphs data tables using the Speech Organizer:

TABLE 12

| Operation | Description | Data tables affected |
|---|---|---|
| Add | Define a new SpeechItem and link it to a screen object<br>New Speech Items are defined and linked to a screen object using the Speech Editor (see Speech Editor) on the Add Speech Item form ( FIG. 14).<br>The procedure is as follows (for a detailed description, see FIG. 15, FIG. 16.):<br>When a screen object that does not have a | SpeechItems, Shapes, InterShapes, ShapeParagraphs |

TABLE 12-continued

| Operation | Description | Data tables affected |
|---|---|---|
| | speech item attached is selected on the PowerPoint screen, the Add button on the Speech Organizer form is enabled. (1501) Clicking the Add button queries the user whether he wants to add a new SpeechItem to the screen object or to have the screen object refer to an existing global SpeechItem, if one exists. (1502) Choosing to add a new SpeechItem displays the Add Speech Item form (1503) The SpeechItem text elements are entered in the form (1503) On exiting the form by OK, a new SpeechItem row is defined in the SpeechItems table, the row Id is retrieved. (1504) A new row is defined for the selected screen object in the appropriate table (Shapes, InterShapes or ShapeParagraphs) The creation of the new row depends on the type of screen object selected and whether speech already exists on the shape. FIG. 16 shows how this is determined. The SpeechItemId of the new Shapes, InterShapes or ShapeParagraphs row is set to the Id of the new SpeechItem table row. The SpeechItemId provides the link between the newly defined SpeechItem and Shape. Choosing to refer to an existing global SpeechItem, displays the list of existing global SpeechItems (1505) Selecting an item from the list causes a new row to be defined for the selected screen object in the appropriate table (Shapes, InterShapes or ShapeParagraphs) where the SpeechItemId of the new row is set equal to SpeechItemId of the global SpeechItem. (1506) | |
| Edit | Edit a SpeechItem Existing Speech Items are edited using the Speech Editor (see Speech Editor) on the Edit Speech Item Form (FIG. 17). The procedure is as follows (for a detailed description, see FIG. 18): When a screen object that has a speech item attached is selected on the PowerPoint screen, the Edit button on the Speech Organizer form is enabled and the corresponding row on the Shapes Datagrid is selected. (1801) Get selected screen Shape, InterShape or ShapeParagraph data (1802) Get SpeechItem Id and Voice Shape typefrom Shape, InterShape or ShapeParagraph table elements and get Voice (1803) Clicking the Edit button displays the Edit Speech Item form (1804) The SpeechItem text elements are edited in the Edit Speech Item form (1804) On exiting the form by OK, the SpeechItem row is updated in the SpeechItems table (1805). | SpeechItems |
| Del | Delete a Speech Item from a Shape When a Shape, InterShape, or ShapeParagraph Datagrid row is selected, the Del command deletes the row from its data table but does not delete the attached Speech Item from the SpeechItems data table. It stores the ScreenItem Id in the Clipboard. Implemented by the Del button control on the Speech Organizer form (for a detailed description, see FIG. 19). | Shapes, InterShapes, ShapeParagraphs |

TABLE 12-continued

| Operation | Description | Data tables affected |
|---|---|---|
| Sync | Synchronize Paragraph Speech Items When a SpeechItem is assigned to a ShapeParagraph by the Add command, the ShapeParagraphId is stored in the corresponding paragraph on the PowerPoint screen itself, for example, as hypertext of a first character in the paragraph. The purpose of this is to keep track of the paragraph during editing on the PowerPoint screen -- assuming that the first character is carried along with the paragraph if it is moved or renumbered during editing. The stored data allows the Program to locate the paragraph in its new position in the text range (or to determine that it has been deleted), and identify its linked ShapeParagraph, and consequently the Speech Item, assigned to it. The Sync function on the Speech Organizer is provided to scan all paragraphs on a slide for the stored ShapeParagraphId and update the ParaNum element of the ShapeParagraph or delete a ShapeParagraph, as necessary (for a detailed description, see FIG. 20.) | ShapeParagraphs |
| Role | Assign Role Assigns or de-assigns a Voice Role directly to the selected Shape, InterShapes or ShapeParagraph, instead of the Voice Role that is assigned by the active Voice Scheme. It is implemented by the Role button control on the Speech Organizer form which displays the Voice Role Assignment form shown in FIG. 21. The radio button determines the method of assigning a Voice Role to the Shape: by Voice Scheme or direct. In the latter case, the combo box control selects the Voice Role to be directly assigned (for a detailed description, see FIG. 22). | Shapes, InterShapes, ShapeParagraphs |
| Anim | Launches the Speech Animator form (see Speech Animator) | |
| Promote Order | Decrements the Order element of the selected Shape and refreshes the display. Implemented by the up-arrow button control on the Speech Organizer form | Shapes |
| Demote Order | Increments the Order element of the selected Shape and refreshes the Shapes display. Implemented by the down-arrow button control on the Speech Organizer form. | Shapes |
| Merge from Notes | Gets updated SpeechItems from the Speech Notes document and inserts them in the SpeechItems table (see Speech Notes) | SpeechItems |
| Copy to Clipboard | Copy Speech Item to Clipboard Copies the SpeechItemId of the selected Shape, ShapeParagraph or InterShape to the Clipboard buffer. Implemented by Ctrl-C. The copied SpeechItem can be pasted to another Shape, ShapeParagraph or InterShape by the Add or Edit operations or by Paste from Clipboard. | Clipboard |
| Paste from Clipboard | Paste Speech Item from Clipboard The default behavior of this function is as follows: If the SpeechItemId in the Clipboard refers to a global SpeechItem, this function assigns the SpeechItemId in the Clipboard buffer to the selected Shape, ShapeParagraph or InterShape. If the SpeechItemId in the Clipboard refers to a non-global SpeechItem, this function replaces the elements of the SpeechItem referred | Shapes, InterShapes, ShapeParagraphs |

TABLE 12-continued

| Operation | Description | Data tables affected |
|---|---|---|
| | to by the selected Shape, ShapeParagraph or InterShape with the elements of the SpeechItem referred to by SpeechItemId in the Clipboard. The default behavior can be overridded by user selection. Implemented by Ctrl-V. | |

7.2. Speech Editor

This section describes the Speech Editor, which provides functionality for entering and editing the SpeechItems table elements.

7.2.1. Representing SAPI Tags by Text Graphics

To edit the spoken text, the Speech Editor uses a rich text box control, which can display text graphics such as italics and bold. Speech modulation (for example, SAPI) tags are represented on the rich text box control in a simple way by text graphics, (italics for emphasis, and an em-dash for silence, as described below); the user does not see the tag at all. This method overcomes the following difficulties in working with tags in text:

- Hard to remember the tags to insert in the text, hard to insert them
- Hard to read the tag in the text and hard to read text when tags are embedded
- If any part of the tag is inadvertently removed or changed during editing, the tag will not be processed and the entire text may not be processed.

The text graphics are chosen to suggest the speech modulation effects they represent. Thus they are easy to recognize and do not disturb normal reading of the text. If the speech graphics are inadvertently removed, the entire tag is removed so that processing does not fail. Inserting and removing the graphic representation is performed by button controls in a natural way, as shown below.

When editing of the spoken text is complete, the Program replaces the text graphics by the corresponding speech modulation tags and the resulting plain text is stored in the SpeechItems table. When the stored speech item is retrieved for editing, the Program replaces the tags by their graphic representation and the result is displayed in the rich text box of the Speech Editor.

7.2.2. Speech Text Editing Operations

The following operations are defined for speech items.

TABLE 13

| Operation | Description |
|---|---|
| Data entry | Text entry by typing in |
| Preview | Hear the current text spoken. The Speak method from SpVoiceClass is used to play the voice. The voice that is associated with the Speech Item's screen object by Voice Scheme or by direct association is used. |
| Emphasis | Adds emphasis voice modulation (SAPI tag: <emph>) to the selected word or phrase, as follows. The Emphasis button control is enabled when a complete word or phrase is selected, as shown in FIG. 23. Clicking the Emphasis button causes the emphasis tag to be represented on the form by displaying the emphasized word or phrase in italics, as shown in FIG. 24. Selecting an already emphasized (italicized) word or phrase changes the emphasis button text to italics as shown in FIG. 25; clicking it now de-emphasizes the selected text. (The <emph> tag is no longer represented on the text). |
| Silence | Adds a fixed time length of silence (SAPI tag: <silence>) in the voice stream, as follows. |

TABLE 13-continued

| Operation | Description |
|---|---|
| | The Silence button is enabled when the cursor is between words. Clicking the Silence button causes the silence tag to be represented on the form by displaying an em dash (—) as shown in FIG. 26. The Silence tag representation is removed by deleting the em dash (—) from the text by normal text deletion. The method of representing SAPI tags by text graphics can be extended to other types of SAPI voice modulation tags as well. |
| Dictation | Text entry by dictation. The button control "Start Dictation" activates a speech recognition context, for example, SpeechLib.SpInProcRecoContext( ), which is attached to the form. The user speaks into the microphone and the dictated text appears on the text box where it can be edited. The button text changes to "Stop Dictation"; another click on the button stops the dictation. The dictation stops automatically on leaving the form (OK or Cancel). |
| Input from WAV file | Text entry by input from WAV or other type of sound file. The button control "Read from WAV File" activates a speech recognition context, for example, SpeechLib.SpInProcRecoContext( ), which is attached to the form. The WAV filename is entered, the file is read by the Speech recognizer and the text appears on the text box where it can be edited. |
| Save to WAV file | On exiting the form by OK, you can choose to create a wav file from the spoken speech text on the form. The Speak method from SpVoiceClass with AudioOutputStream set to output to a designated wav file is used to record the voice. |
| Interactive | Defines the animation type of the screen object to which the speech item being added is attached. If the box is checked, the screen object is defined as an Interactive Shape; otherwise it is defined as an Ordered Shape or ShapeParagraph. This function is available in the Add Speech Item screen only and only for non-text objects. |
| OK | On exiting the form, the spoken text is transformed into plain text with voice modulation tags. The emphasized text (italics) is changed to plain text within SAPI emphasis tags <emph>, and the em dash is changed to the SAPI silence tag <silence msec = "500"/>, where the 500 ms silence is used as default. |
| Global find and replace | Executes a global find and replace function, which can search all speech items stored in the SpeechItems table for a string and replace it with another string, including all the functionality usually associated with a find and replace function. |
| Subtitles | The Speech Editor edits display text in a separate plain (not rich) text box on the form, for example on a separate tab, and can be edited as shown in FIG. 27. A check box lets you choose to keep the display text the same as the spoken text or independent of it. If you choose to keep it the same, when the editing is complete the display text is made equal to the spoken text but without the speech modulation tags. |
| Global | Defines whether this speech item will be defined as a global speech item. Implemented by a check box. Available in Add Speech Item and Edit Speech Item forms. |

7.3. Operations on Data Tables through the Preferences Form

The Preferences form is used for performing operations on the Voices, VoiceRoles, and VoiceSchemes data tables The Speech Menu Preferences menu item causes the Preferences form for the current presentation to be displayed.

7.3.1. Voices, VoiceRoles, and VoiceSchemes Data Table Operations

The following operations can be performed on data tables using the Preferences form:

7.3.2. Operations on the Voices Table

FIG. 28 shows the Voices displayed on the Preferences form.

The following operations are defined for Voices.

Update Voice rate—the Rate element is changed for a specific Voice row

Update Voice volume—the Vol element is changed for a specific Voice row

FIG. 28 shows how the methods have been implemented using separate slider controls for Voice Rate and Voice Volume, which are applied to the individual Voice selected on the Preferences form Datagrid.

In an alternative implementation, a common rate and volume of all the voices could be set using two sliders and an additional two sliders would provide an incremental variation from the common value for the selected individual voice.

7.3.3. Operations on the VoiceRoles Table

FIG. 29 shows the VoiceRoles and Voices elements displayed on the Preferences Form. The VoiceRoles and Voice tables are bound to the Roles and Voices Datagrid controls on the form. Because of the data binding, when a Voice Role is selected in the upper control, only its child Voices are shown in the lower control. The following operations are defined for VoiceRoles.

AssignDefaultVoices—sets default Voices for CastedVoiceName for each VoiceRole, depending on availability of Voices on the specific computer. This method is performed on startup.

UpdateCastedVoice—assigns (casts) a different actual Voice to the Voice Role by setting the CastedVoiceName element.

The UpdateCastedVoice method is performed by the Cast Voice button control when a Role and a Voice are selected. (The Cast Voice method could have been implemented by a combo box control in the Casted Voice column in the upper Datagrid.)

7.3.4. Operations on the VoiceSchemes Table

FIG. 30 shows the VoiceSchemes and VoiceSchemeUnits table elements displayed on the Preferences Form. Both VoiceSchemes and VoiceSchemeUnits are bound to Datagrid controls on the form. Because of the data binding, when a Voice Scheme is selected in the upper control, the child VoiceSchemeUnits are shown in the lower control.

The following operations are defined for VoiceSchemes.

SetActiveScheme—set the active VoiceScheme

The SetActiveScheme method is activated by the SetActive button control when the desired VoiceScheme is selected.

7.3.5. Custom Data

Custom data can be created for Voice Role, VoiceShapeType, and Voice Schemes to replace the default ones.

8. APPLICATION TO OTHER PRESENTATION SOFTWARE

The part of the current embodiment of the invention described thus far in the sections Program Data Organization and Operations on Data Tables, including the Dataset tables and the operations on them, is generally applicable to other presentation software which applies speech to visual screen objects, such as Microsoft® Front Page® and Macromedia® Flash®. In addition, a stand-alone application using these components, not directly integrated with any specific presentation software, could be implemented that could produce speech files according to user requirements while storing and maintaining the data in an xml text file.

In general, the Dataset tables would be characterized as follows:

SpeechItems Table—To hold the speech items, as above.

Shapes Table—To represent the visual screen object of the presentation software to which the speech items are attached. SlideId and ShapeName would be replaced with the appropriate Shape unique identifiers. For a stand-alone application, a table row with the appropriate defining elements would represent a screen object to which the speech items are to be attached.

ShapeParagraphs Table—To represent the child visual screen objects to which the speech items are attached. ParaNum and ShapesId would be replaced with the appropriate child shape unique identifiers. For a stand-alone application, a table row with the appropriate defining elements would represent a screen object to which the speech items are to be attached.

Voices Table—Voices, as above

VoiceRoles Table—Voice Roles, as above

VoiceShapeTypes Table—Voice shape types relevant to the presentation software visual objects VoiceSchemeUnits Table—Voice Scheme Units, as above Voice Schemes Table—Voice schemes, as above

9. SYSTEM-LEVEL OPERATION

The current embodiment of the Program is implemented as a Microsoft PowerPoint Add-In. FIG. 31 shows the system diagram. On startup, the PowerPoint application loads the Program Add-In. For each PowerPoint presentation, the Program Add-in opens a separate Dataset to contain the speech information for the presentation. The Dataset is stored as an xml file when the application is closed.

FIG. 32 shows the method calls made by the PowerPoint Connect object as the Add-In is loaded. A Speech Menu is added to the main PowerPoint command bar and provides access to the major speech functionality.

10. SPEECH OBJECT

The Speech object is the highest-level object of the Program Add-in application. A Speech object is associated with an individual PowerPoint presentation; a Speech object is created for each presentation opened and exists as long as the presentation is open. When a Speech object is created it is inserted into a SpeechList collection; when the presentation is closed the Speech object is removed from the collection.

10.1. Speech Object Creation

Speech objects are created and removed in PowerPoint application event handlers when the PowerPoint user:

Creates a new presentation (created)

Opens an existing presentation (created)

Closes a presentation (removed)

as shown in FIG. 33.

10.2. Speech Object Actions

The Speech object performs the following actions:

Creates and initializes a Dataset for the presentation.

Creates the Organizer and Animator Forms for the presentation

Handles the Speech Menu items.

FIG. 34 shows the flow for the first two items; the actions are executed in the constructor method of the new Speech object.

10.3. Speech Menu

The user interface for the major Speech functionality is the Speech Menu, which is located in the command bar of the Microsoft PowerPoint screen (see FIG. 35).

The Menu Items are:

Preferences—Shows the Preferences Form

Organizer—Shows the Speech Organizer Form for the presentation

Load—Loads an XML file into the presentation Dataset

Save—Saves the presentation Dataset to an XML file.

Additional menu items:

Help

Properties (creation date, version, language, etc.)

A choice of Speech Menu item raises an event that calls an event handler in the Speech Object, which receives the menu item name and performs the action.

11. SPEECH ANIMATOR 11.1.1. Implementation Note

The Speech Animator described in this section stores generated speech in sound files, which are played in the slide show by speech media effects. The advantage of this method is that the neither the Program nor the voices need to be installed on a computer in order to animate speech on a slide show; the user only needs to have PowerPoint, the presentation file and the accompanying sound files.

If the Program and voices are installed on a computer, a different Speech Animator can be used which can play the voices directly and does not require storing the speech in sound files (see Direct Voice Animation).

11.2. Speech Animator Functionality

Hereinafter, the term "ShapeEffect" refers to a visual animation effect associated with a Shape, InterShape or ShapeParagraph. A ShapeEffect must exist for a Shape, InterShape or ShapeParagraph in order to generate speech effects for it.

The Speech Animator has the following functionality, which is explained in detail below.

An Animation Status Display

Automatically generates ShapeEffects for screen objects for which speech items have been assigned but do not have ShapeEffects.

Re-orders the slide main animation sequence to conform to the Shapes order.

Generates subtitle effects and speech media effects in the slide animation sequences for screen objects for which speech items have been assigned and which have ShapeEffects.

Generates Speech Notes for global editing of SpeechItems without using the Program.

The Speech Animator functionality is integrated into a Speech Animation Wizard 11.3. Animation Commands Clicking on the Anim button on the Speech Organizer form displays the Speech Animator form, shown in FIG. 36:

The Speech Animator Form has four commands, divided into two groups:

For an individual selected screen object for which a speech item has been assigned and which has a visual animation effect:

Animate—adds subtitle and voice animation effects for the object

De-Animate—remove subtitle and voice animation effects from the screen object

For all screen objects on the slide for which speech items have been assigned and which have visual animation effects:

Animate—adds subtitle and voice animation effects for all objects

De-Animate—removes subtitle and voice animation effects from all screen objects 11.4. Animation Status Display The Program provides a display, FIG. 37 to show the animation status on a slide and includes:

1. Total number Shapes on slide (number of OrderedShapes with SpeechItems attached) (3701)
2. Shapes Animated—The number of OrderedShapes on the slide that have a ShapeEffect defined for them. (3702)
3. Synchronized with Speech Order—Whether the animation order of the ShapeEffects of (2) conform to the Shapes table Order element. (3703)
4. InterShapes on slide (number of InteractiveShapes with SpeechItems attached) (3704)
5. InterShapes Animated—The number of InterShapes on the slide that have a ShapeEffect defined for them. (3705)

11.5. Automatic Shape Animation

Speech is animated only for screen objects that have ShapeEffects defined for them. The Program provides an option to automatically generate ShapeEffects. There are two cases:

No ShapeEffect Defined

Some ShapeEffects Defined 11.5.1. No ShapeEffect Defined

In case none of the Shapes have a ShapeEffect defined for them on the slide main animation sequence, the Program provides an option to automatically define a ShapeEffect of a default type, for example, an entrance appear effect, for each Shape, where the order of the newly defined effects in the main animation sequence conforms to the Shapes order. The Program detects when none of the Shapes have a ShapeEffect defined for them and displays the option as in FIG. 39.

In case none of the InterShapes have a ShapeEffect defined for them in a slide interactive sequence, the Program provides an option to automatically define a ShapeEffect of a default type, for example, an emphasis effect. The Program detects when none of the InterShapes have a ShapeEffect defined for them and displays the option as in FIG. 40.

11.5.1.1. Procedure for Adding ShapeEffects to Ordered Shapes

To add ShapeEffects to Shapes on a slide with SlideId, add an default entrance effect to the slide main animation sequence for each Shape, as follows:

1. For each Shape with the SlideId in the Shapes table in the order of the Order element perform:
2. If the Shape has no child ShapeParagraphs, add an entrance effect (for example, appear effect) to the Shape using the main sequence AddEffect method with MsoAnimateByLevel=msoAnimateLevelNone and MsoAnimTriggerType=msoAnimTriggerOnPageClick
3. If the Shape has child ShapeParagraphs, add an appear effect to each ShapeParagraph using the main sequence AddEffect method with MsoAnimateByLevel=msoAnimateTextByFirstLevel and MsoAnimTriggerType=msoAnimTriggerOnPageClick 11.5.1.2. Procedure for Adding ShapeEffects to Interactive Shapes To add ShapeEffects to InterShapes on a slide with SlideId, add an emphasis effect that triggers on clicking the InterShape:

1. For each InterShape with the SlideId in the InterShapes table perform:
2. Add a new interactive sequence to the slide
3. Add an emphasis effect, for example msoAnimEffectFlashBulb, to the InterShape using the interactive sequence AddEffect method with MsoAnimateByLevel=msoAnimateLevelNone and MsoAnimTriggerType=msoAnimTriggerOnShapeClick
4. Assign the trigger shape for the effect to be the current InterShape (effect.Timing.TriggerShape=InterShape)

11.5.2. Some ShapeEffects Defined

In case, some but not all of the Shapes have a ShapeEffect defined for them on the slide main animation sequence, the Program provides an option to automatically define a ShapeEffect for the Shapes that do not yet have one defined. In this case, the newly defined ShapeEffects are placed at the end of the slide main animation sequence and can now be re-ordered using the procedure in the section "Procedure for Re-ordering the Slide Animation Sequence". The Program detects when some but not all of the Shapes have a ShapeEffect defined for them and displays the option as in FIG. 41.

Similarly, in case, some but not all of the InterShapes have a ShapeEffect defined for them on slide interactive animation sequences, the Program provides an option to automatically define a ShapeEffect for the InterShapes that do not yet have one defined.

Following is the procedure for adding ShapeEffects to additional Shapes on a slide with SlideId.

11.5.2.1. Procedure for Adding Additional ShapeEffects to Ordered Shapes

1. For each Shape with the SlideId in the Shapes table in the order of the Order element perform:
2. Loop over the ShapeEffects in the slide animation sequence to find the ShapeEffect for the Shape using the criterion ShapeEffect.Shape.Name=Shape.Name.
3. If no ShapeEffect is found, add an effect following the procedure in.Procedure for Adding ShapeEffects to Ordered Shapes)

11.5.2.2. Procedure for Adding Additional ShapeEffects to Interactive Shapes

1. For each InterShape with the SlideId in the InterShapes table perform:
2. Loop over the ShapeEffects in the slide interactive animation sequences to find the ShapeEffect for the Shape using the criterion ShapeEffect.Shape.Name=Shape.Name.
3. If no ShapeEffect is found, add an effect following the procedure in Procedure for Adding ShapeEffects to Interactive Shapes.

11.6. Coordinating the Animation Sequence with the Shapes Order

Another feature of the Program is the ability to coordinate the sequence of animation effects in the slides main animation sequence with the sequence of the Shapes according to the Order element in the Shapes table. As mentioned, the Order element of the Shapes can be adjusted by the Promote Order and Demote Order commands enabling the user to define an animation order among the Shapes.

Referring to the procedure above "Animating all SpeechItems on a Slide" the speech animation always proceeds in the order of the ShapeEffects in the slide animation sequence, even if that is not the order of the Shapes according to their Order element.

The Program detects when the slide animation sequence is not coordinated with the Shapes sequence and provides an option to automatically reorder the slide animation sequence to conform to the Shapes sequence as shown in FIG. 38.

11.6.1. Procedure for Re-ordering the Slide Animation Sequence

The following is a procedure to re-order the slide animation sequence to conform to the Shapes sequence on a slide with SlideId.

1. Loop over all Shapes with the SlideId in the Shapes table in the order of the Order element
2. For each Shape, loop over the ShapeEffects in the slide animation sequence to find the ShapeEffect for the Shape using the criterion ShapeEffect.Shape.Name= Shape.Name. Record the sequence number of the ShapeEffect found.
3. Compare the sequence numbers of found ShapeEffects for successive Shapes in the Shapes loop. If the sequence number of the currently found ShapeEffect is less than the sequence number of a previously found ShapeEffect, then move the currently found ShapeEffect to after the previously found ShapeEffect. When a Shape has ShapeParagraphs, the effects for all paragraphs must be moved also.
4. Keep looping until all ShapeEffects conform to the Shapes table order.

After this procedure is complete, the slide animation sequence will conform to the Shapes order.

11.7. Animating SpeechItems

This section shows the procedure for animating the speech items. Four stages are described:

Animating an Individual SpeechItem for Ordered Shapes
Animating all SpeechItems on a Slide for Ordered Shapes
Animating an Individual SpeechItem for Interactive Shapes
Animating all SpeechItems on a Slide for Interactive Shapes 11.7.1. Animating an Individual SpeechItem for Ordered Shapes This section describes how an individual speech item attached to an ordered screen object, Shape or ShapeParagraph, is animated. It is assumed that a ShapeEffect exists for the Shape or ShapeParagraph on a slide with SlideId.

In general, a SpeechItem attached to a Shape is animated by creating a media speech effect and a subtitle effect and inserting them in the slide main animation sequence after the Shape's ShapeEffect.

The animation procedure for animating an individual speech item is as follows:

1. Remove existing subtitle and media effects (see De-Animating all SpeechItems on a Slide)
2. For each Shape or ShapeParagraph, referred to hereinafter as "SpeechShape", to which the speech item is attached. (For a single animation, SpeechShape will be selected on the Speech Organizer; for animation on the entire slide, SpeechShape is part of a loop performed over the Shapes and ShapeParagraphs tables—see Animating all Ordered SpeechItems on a Slide.)
3. Get the spoken speech text for SpeechShape, referred to hereinafter as "SpeechText", and the subtitle text, referred to hereinafter as "SubtitleText", from the SpeechItemText and SpeechItemTextNoTags elements of the SpeechItems table row with row number SpeechShape.SpeechItemId.
4. Get the actual voice required, referred to hereinafter as "SpeechVoice", according to the Voice Scheme or direct Role assignment for SpeechShape, using the VoiceShapeType or DirectVoiceRole elements (see Voice Retrieved for a Shape).
5. Write the media file, referred to hereinafter as "SoundFile", using the SpeechText and SpeechVoice. The Speak method from SpVoiceClass with AudioOutputStream set to output to a designated way file (or other type of sound file) is used to record the SpeechVoice. Name the SoundFile with the unique name: "SlideId-ShapeName-ParaNum" where SlideId is the Identifier of the current Slide, ShapeName is the name of the current SpeechShape (SpeechShape.Name) and ParaNum is the paragraph number in case the screen object is a ShapeParagraph.
6. Find the ShapeEffect of SpeechShape in the slide animation sequence and record its sequence number for later use. To find it, loop over the effects the slide main animation sequence until Effect[i].ShapeName=SpeechShape.Name where the ShapeName property of Effect is the name of the PowerPoint Shape to which the effect is attached and SpeechShape.Name is the name property of the current SpeechShape.

Effect[i].Paragraph=ParaNum, where the Paragraph property of Effect is the paragraph number of the paragraph to which the effect is attached and ParaNum is the paragraph number of the current ShapeParagraph in its text range (this condition is added for ShapeParagraphs).

7. Create a media object PowerPoint shape, referred to hereinafter as "SoundShape", for SoundFile using AddMediaObject method
8. Set SoundShape.AlternativeText to "speechSoundShape" to identify the shape for subsequent shape deletion.
9. Create an effect, referred to hereinafter as "SoundEffect", attached to SoundShape and add it to the end of the slide's main animation sequence using the MainSequence.AddEffect method, where the effect type is msoAnimEffectMediaPlay and the trigger type is msoAnimTriggerAfterPrevious. The SoundEffect.DisplayName property contains the unique name of the SoundFile assigned in step 5, making it possible to associate the SoundEffect with SpeechShape. In addition to SoundEffect, this step also produces an entrance appear effect for the speaker icon which is not needed and will be deleted in the next step.
10. Delete the entrance appear effect for the speaker icon produced by the previous step from the second to the last position in the slide animation sequence.

For subtitles add the following steps:

11. Add a PowerPoint textbox shape, referred to hereinafter as "SubtitleShape" using the AddTextbox method.
12. Set SubtitleShape.AlternativeText to "speechTextShape" to identify the shape for subsequent shape deletion.
13. Add SubtitleText to the SubtitleShape.Text property
14. Adjust the font size of the text box to the length of SpeechText to fit the text into the text box
15. Create an appear effect, referred to hereinafter as "SubtitleEffect", to SubtitleShape and add it to end of the slide's main animation sequence using the MainSequence.AddEffect method. This effect displays the Subtitle text as the text is spoken.

At this stage in the procedure, two effects have been added to the end of the animation sequence: SoundEffect and SubtitleEffect.

16. Finally, move the SubtitleEffect and SoundEffect to immediately follow ShapeEffect in the animation sequence in the order ShapeEffect—SubtitleEffect—SoundEffect.
17. Use the Zorder command to place the Subtitle text box on top of all previous boxes (Bring to Front). This will cause the Subtitles to appear in their animation order.

11.7.2. Animating all Ordered SpeechItems on a Slide

To animate all SpeechItems on a slide with SlideId use the following procedure based on the procedure of the previous section Animating an Individual SpeechItem for Ordered Shapes 1. Execute the Sync function to align speech text on paragraphs in slide
2. Loop over all rows with the SlideId in the Shapes table according to the Order element
3. For each row in the Shapes table If the Shape does not have child ShapeParagraphs, animate the Speech Item on the Shape, following the procedure above: Animating an Individual SpeechItem for Ordered Shapes.

If the Shape has child ShapeParagraphs, then loop over the ShapeParagraph rows in the order of the ParaNum element and animate the SpeechItem for each ShapeParagraph, following the procedure above: Animating an Individual SpeechItem for Ordered Shapes Add SpeechItem information to SpeechText table for Speech Notes (see Speech Notes)

The SubtitleEffect and SoundEffect effects for each Shape are now located directly after the ShapeEffect.

4. Write Speech Notes xml text document to Notes

The animation sequence for the slide is now ready for playing in the slide show.

11.7.3. Animating an Individual SpeechItem for Interactive Shapes

This section describes how an individual speech item attached to an interactive screen object InterShape is animated. It is assumed that a ShapeEffect exists for the InterShape or ShapeParagraph.

The procedure is similar to the one for ordered screen objects (Animating all SpeechItems on a Slide for Interactive Shapes Animating an Individual SpeechItem for Ordered Shapes) except for the following differences:

The animation uses interactive sequences instead of the main animation sequence

The Subtitle display uses two effects: an appear effect to display the Subtitle text and a disappear effect to hide the Subtitle text after the text is spoken.

The animation procedure for animating an individual speech item is as follows:

1. Remove existing subtitle and media effects
2. Start with the InterShape, referred to hereinafter as "SpeechShape", to which the speech item is attached. (For a single animation, SpeechShape will be selected on the Speech Organizer; for animation on the entire slide, SpeechShape is part of a loop performed over the InterShapes table—see Animating all Interactive SpeechItems on a Slide.)
3. Get the spoken speech text for SpeechShape, referred to hereinafter as "SpeechText", and the subtitle text, referred to hereinafter as "SubtitleText", from the SpeechItemText and SpeechItemTextNoTags elements of the SpeechItems table row with row number SpeechShape.SpeechItemId.
4. Get the actual voice required, referred to hereinafter as "SpeechVoice", according to the Voice Scheme or direct Role assignment for SpeechShape, using the VoiceShapeType or DirectVoiceRole elements (see Voice Retrieved for a Shape).
5. Write the media file, referred to hereinafter as "SoundFile", using the SpeechText and SpeechVoice. The Speak method from SpVoiceClass with AudioOutputStream set to output to a designated way file (or other type of sound file) is used to record the SpeechVoice. Name the SoundFile with the unique name: "SlideId-ShapeName-ParaNum" where SlideId is the Identifier of the current Slide, ShapeName is the name of the current SpeechShape (SpeechShape.Name) and ParaNum is the paragraph number in case the screen object is a ShapeParagraph.
6. Find the ShapeEffect of SpeechShape in the slide interactive animation sequence. To find it, loop over the effects the slide interactive animation sequences until Effect[i].ShapeName=SpeechShape.Name where the ShapeName property of Effect is the name of the PowerPoint Shape to which the effect is attached and SpeechShape.Name is the name property of the current SpeechShape.

7. Create a media object PowerPoint shape, referred to hereinafter as "SoundShape", for SoundFile using AddMediaObject method
8. Set SoundShape.AlternativeText to "speechSoundShape" to identify the shape for subsequence shape deletion.
9. Create an effect, referred to hereinafter as "SoundEffect", attached to SoundShape and add it to the end of the slide interactive animation sequence using the Sequence.AddEffect method, where the effect type is msoAnimEffectMediaPlay and the trigger type is msoAnimTriggerAfterPrevious. The SoundEffect.DisplayName property contains the unique name of the SoundFile assigned in step 5, making it possible to associate the SoundEffect with SpeechShape. In addition to SoundEffect, this step also produces an extra msoAnimEffectMediaPlay effect in a separate interactive sequence which is not needed and will be deleted in the next step.
10. Delete the extra msoAnimEffectMediaPlay effect produced by the previous step.

For subtitles add the following steps:

11. Add a PowerPoint textbox shape, referred to hereinafter as "SubtitleShape" using the AddTextbox method.
12. Set SubtitleShape.AlternativeText to "speechTextShape" to identify the shape for subsequent shape deletion
13. Add SubtitleText to the SubtitleShape.Text property
14. Adjust the font size of the text box to the length of SpeechText to fit the text into the text box
15. Create an appear effect, referred to hereinafter as "SubtitleEffect", to SubtitleShape and add it to end of the interactive animation sequence using the Sequence.AddEffect method
16. Create a disappear effect to SubtitleShape and add it to end of the interactive animation sequence using the Sequence.AddEffect method
17. Finally, move the two SubtitleEffects and SoundEffect to immediately follow ShapeEffect in the interactive animation sequence in the order ShapeEffect—SubtitleEffect (appear)—SoundEffect—SubtitleEffect (disappear). Accordingly, any time the interactive shape is clicked, the Subtitles appear, the text is spoken and then the Subtitles are hidden.

11.7.4. Animating all Interactive SpeechItems on a Slide

To animate all Interactive SpeechItems on a slide with SlideId use the following procedure based on the procedure of the previous section Animating an Individual SpeechItem for Interactive Shapes:

1. Execute the Sync function to align speech text on paragraphs in slide
2. Loop over all rows with the SlideId in the InterShapes table
3. For each row in the InterShapes table:
   Animate the Speech Item on the InterShape, following the procedure above: Animating an Individual SpeechItem for Interactive Shapes.
   Add SpeechItem information to SpeechText table for Speech Notes (see Speech Notes)
4. Write Speech Notes xml text document to Notes The animation sequence for the slide is now ready for playing in the slide show.

11.7.5. De-Animating all SpeechItems on a Slide

This procedure removes all media and subtitle effects from the slide, for both ordered and interactive shapes.

1. Loop over all PowerPoint Shapes in on the slide
   If the Shape. AlternativeText="speechSoundShape", the Shape is a speech media shape. Delete the Shape. All the attached effects are also deleted
   If the Shape. AlternativeText="speechTextShape", the Shape is a speech subtitle text box shape. Delete the Shape. All the attached effects are also deleted 11.8. Speech Notes The Speech Notes is an editable text document of all of the SpeechItems animated in a slide which is generated and written by the Program into the Microsoft PowerPoint Notes pane of each slide. The information includes SpeechItemId, ShapeEffect Display Name, SpokenText, and SubtitleText. Once the information is in the Notes pane, a global edit on all SpeechItems on a slide, or in the entire presentation, can be performed with the editing functionality of PowerPoint. After editing them, Speech Notes can be read back by the Program and any changes can be merged with the SpeechItems table.

The purpose of the Speech Notes is to provide a medium to view and edit SpeechItems of a presentation without using the Program. This functionality allows a PowerPoint user that does not have the Program installed to edit SpeechItems in a presentation and so allows a worker who has the Program to collaborate with others who do not have the Program to produce the presentation's speech.

This functionality is implemented as described in the following section.

11.8.1. SpeechText Table

During the speech item animation process, the SpeechItems are written to the Notes as xml text. For this purpose a separate Dataset is defined that contains one table, SpeechText, as follows:

TABLE 14

| Name | Type | Description |
|---|---|---|
| Id | Int | Id of SpeechItem |
| Shape | String | Display name of the ShapeEffect |
| SpokenText | String | The speech text to be read by the text to speech processor, which can contain voice modulation tags, for example, SAPI tags |
| SubtitleText | String | Display text to be shown as visual text on the screen at the same time the speech text is heard. This text does not contain SAPI tags. |

The SpeechText table is dynamically filled with information from the SpeechItems table as the SpeechItems on the slide are animated and, after the animation is complete, the Dataset is written to the Notes as an xml string. The Speech Notes xml text is imported back to the Program by loading the edited xml string into the SpeechText table. There, the rows are compared and any changes can be merged with the corresponding rows of the SpeechItems table.

In another implementation, the SpeechText for all slides could be written to a single text document external to PowerPoint which could be edited and then loaded and merged with the SpeechItems table.

11.9. Speech Animation Wizard

In order to organize and integrate all of the Speech Animator functionality, the Speech Animator form uses a Speech Animation Wizard. The Speech Animation Wizard includes the following steps:

1. Click the Animate button in the "Animate Speech on Slide" area of the Speech Animator form (FIG. 36) to launch the Wizard.
2. If the Wizard detects that all of the Shapes have a ShapeEffect defined for them on the slide main animation sequence, but that the order does not conform to the Shapes order, it displays an option to re-order the slide main animation sequence to conform to the Shapes order (FIG. 38).

3. If the Wizard detects that none of the Shapes have a ShapeEffect defined for them on the slide main animation sequence, the wizard displays an option (check box control, for example) to have the Program automatically define a ShapeEffect for each Shape as described above in the section Automatic Shape Animation (FIG. 39). In this case, the Wizard does not proceed (the Next button is not enabled, for example) until the user selects the option. If this option is selected, the order of the ShapeEffects will automatically conform to the Shapes order and the Wizard will proceed to its final step.
4. If the Wizard detects that some but not all of the Shapes have a ShapeEffect defined for them on the slide main animation sequence, the wizard displays an option (check box control, for example) to automatically define a ShapeEffect for the Shapes that do not yet have one defined as described above in the section Automatic Shape Animation (FIG. 41). If this option is checked, pressing Next will cause the missing ShapeEffects to be defined as default effects, for example, entrance appear effects, and placed at the end of the slide animation sequence. If the resulting order of the slide animation sequence does not conform to the Shape order, the Wizard continues to Step 2 above (FIG. 38). If it does, the Wizard proceeds to the final step.
5. If the Wizard detects that not all of the InterShapes have a ShapeEffect defined for them on a slide interactive animation sequence, the wizard displays an option (check box control, for example) to automatically define a ShapeEffect for the InterShapes that do not yet have one defined as described above in the section Automatic Shape Animation (FIG. 40). If this option is checked, pressing Next will cause the missing ShapeEffects to be defined as default effects, for example, emphasis effects, in a slide interactive animation sequence.
6. In the final step of the Wizard, the user clicks Finish to launch the slide speech animation procedures described in the sections Animating all Ordered SpeechItems on a Slide and Animating all Interactive SpeechItems on a Slide, which creates the complete speech animation sequence. This screen has two options: Display Subtitles and Write Speech Notes. If the Display Subtitles check box is checked, SubtitleEffects are produced, if not, they are not produced. If the Write Speech Notes check box is checked, Speech Notes are produced, if not, they are not produced.

11.10. Direct Voice Animation

In another implementation of the Speech Animator part of the Program, instead of using the Voices to create speech media files and playing the speech media files by a media effect, the speech could be triggered directly by an animation event. PowerPoint raises the SlideShowNextBuild event when an animation effect occurs. Thus, the event handler of the SlideShowNextBuild event raised by the animation build of ShapeEffect could use the SpeechLib Speak method to play the Voice directly. This way a Shape's speech would be heard together with the animation of ShapeEffect. This implementation eliminates the need to store speech in way files, but it requires that the Program and the vendor Voices be installed on the computer on which the slide show is played.

12. SYSTEM VIEW

The current embodiment of the invention, as described herein, constitutes a system, comprising:

An screen object recognizer

A database

A speech synthesizer

A speaker

FIG. 43 shows the system diagram.

The invention claimed is:

1. A method for adding a voice soundtrack and/or subtitles to a visual presentation, said method allowing speech text and/or subtitles to be inputted and linked with individual screen objects in said presentation to provide verbal and visual descriptions, explanations and elaborations of said screen objects that are timewise-coordinated with visual animations of said screen objects during said presentation said presentation being produced by a computer system comprising hardware and software elements; the hardware elements including a processor, a display means and a speaker, the software elements comprising a speech synthesizer/speech engine, text-to-speech voices, a database platform and a software presentation application, said method including the following steps:

identifying screen objects within a visual presentation on the display means to which speech text and/or subtitles are to be linked, said screen objects comprising shapes and/or text paragraphs where said shapes are non-textual elements, said screen objects having associated visual animation effects, selected from the group consisting of sequential animation effects and interactive animation effects, wherein the screen object is called "-sequentially-animated-" and "-interactively-animated-", respectively, and tabulating said screen objects;

inputting speech text elements to be synthesized into speech and read by text-to-speech voices and/or inputting display text elements to be displayed as subtitles, and tabulating the speech text elements and/or display text elements, said tabulation including tabulating said speech text elements and/or display text elements together as speech items in a speech items table;

linking said speech items to said screen objects (link 1), wherein the speech and display text elements of said speech items describe, explain and elaborate the screen objects to which the speech items are linked;

identifying two or more voice roles, said voice role being a set of voice characteristics comprising gender, age, language, and character type, and tabulating the voice roles in a voice roles table wherein said voice roles are associated with text-to-speech voices available to the computer;

grouping similar screen objects to be associated with the same voice role together (link 2), the collection of said groupings being denoted "-voice shape types-", and tabulating the voice shape types in a voice shape types table;

classifying said voice shape types according to said voice roles by a voice scheme comprising links (link 3), and tabulating the voice scheme in a voice scheme table;

creating sound media effects and/or subtitle animation effects to be associated with said screen objects, said sound media effects being generated by the synthesizing and text-to-speech reading of the speech text elements of the speech items linked by link 1 to said screen objects, the voice role used in reading said speech text element being determined by first determining the voice shape type that is linked to said screen object by link 2, and then determining the voice role that is linked to said voice shape type by link 3, said voice role being associated with a particular text-to-speech voice available to the computer which is used to read said speech text element, and said subtitle animation effects being created from the display text elements of said linked speech items;

positioning said sound media effects and/or subtitle animation effects associated with sequentially-animated screen objects in juxtaposition with said sequential animation effects in the slide animation sequence, and positioning said sound media effects and/or subtitle animation effects associated with interactively-animated screen objects in juxtaposition with said interactive animation effects, the result being that said sound media effects and subtitle animation effects are timewise-coordinated with the visual animation effects of said screen objects in the presentation wherein as the presentation or slide show plays, the verbal and visual descriptions, explanations and elaborations of said screen objects provided by the speech items occur in timewise coordination with the visual animations of said screen objects, wherein the method further comprises relinking a speech item from one screen object to another screen object.

2. The method of claim 1 wherein the software presentation application comprises Microsoft PowerPoint.

3. The method of claim 1 wherein identifying screen objects comprises identifying the screen object by a mouse click on the screen object.

4. The method of claim 1 wherein said shapes are selected from the group consisting of geometrical shapes, placeholders and pictures.

5. The method of claim 1 wherein said text paragraphs are selected from the group consisting of text in text placeholders, and text in text boxes.

6. The method of claim 1 wherein said sequential animation effects comprises animation of said screen objects in a preset sequence either automatically or in response to a user input, said user input comprising a mouse page click.

7. The method of claim 1 wherein said interactive animation effects comprises random animation of said screen objects in response to a user input, said user input comprising a mouse click on the object.

8. The method of claim 1 wherein tabulating said screen objects comprises separately tabulating the sequentially animated shapes in an ordered shapes table, the sequentially animated text paragraphs in an ordered shape paragraphs table and the interactive animated shapes in an interactive shapes table.

9. The method of claim 1 further comprising a speech text editor for inserting and manipulating voice modulation tags, including SAPI voice modulation tags, in said inputted speech text element, the speech text editor representing voice modulation tags in the text by text characters that are suggestive of the modulation effect, including displaying a silence tag by an em-dash and displaying an emphasis tag applied to a word or phrase by means of italicizing the word or phrase.

10. The method of claim 1 wherein linking said speech items to said screen objects comprises the links being established in the database by entering references in the table entries of said screen objects to the table entries of the corresponding speech items (link 1).

11. The method of claim 1 wherein grouping similar screen objects to be associated with the same voice role together comprises said groupings of screen objects being established in the database by entering references in the table entries of said screen objects to the table entries of the corresponding voice shape type (link 2).

12. The method of claim 1 further comprising globally finding and replacing text strings within the plurality of speech items.

13. The method of claim 1 wherein if a screen object to which a speech item is to be linked is not associated with a visual animation effect, a visual animation effect is automatically associated with said screen object.

14. The method of claim 1 further comprising automatically reordering sound media effects and/or subtitle animation effects associated with screen objects when the visual animation sequence of the said screen objects is reordered.

15. The method of claim 1 further comprising generating a notes document composed of all speech text elements on a slide written in the same order as the animation sequence of the screen objects to which said speech text elements are linked, for each slide in the presentation.

16. The method of claim 1 wherein a voice role is linked directly to a screen object instead of indirectly through a voice shape type and a voice scheme.

17. The method of claim 1 further comprising a plurality of voice schemes wherein one of the voice schemes can be chosen to be the active scheme, meaning that it becomes the current link 3 between the voice shape types and the voice roles.

* * * * *